(12) United States Patent
Rönngren

(10) Patent No.: US 10,460,527 B2
(45) Date of Patent: Oct. 29, 2019

(54) SYSTEMS AND METHODS FOR DISPLAYING IMAGES IN A VIRTUAL WORLD ENVIRONMENT

(71) Applicant: TOBII AB, Danderyd (SE)

(72) Inventor: Denny Rönngren, Danderyd (SE)

(73) Assignee: Tobii AB, Danderyd (SE)

( * ) Notice: Subject to any disclaimer, the term of this patent is extended or adjusted under 35 U.S.C. 154(b) by 102 days.

(21) Appl. No.: 15/640,059

(22) Filed: Jun. 30, 2017

(65) Prior Publication Data
US 2019/0005735 A1 Jan. 3, 2019

(51) Int. Cl.
G06F 3/033 (2013.01)
G06T 19/20 (2011.01)
G06F 3/00 (2006.01)
G06F 3/01 (2006.01)
G06F 1/16 (2006.01)

(52) U.S. Cl.
CPC .............. *G06T 19/20* (2013.01); *G06F 1/163* (2013.01); *G06F 3/002* (2013.01); *G06F 3/011* (2013.01); *G06F 3/013* (2013.01); *G06T 2219/2016* (2013.01)

(58) Field of Classification Search
None
See application file for complete search history.

(56) References Cited

U.S. PATENT DOCUMENTS 9,396,588 B1 * 7/2016 Li .......................... G06F 3/011
2013/0265227 A1 * 10/2013 Julian ................. G06F 3/04812
345/157

2016/0328884 A1 * 11/2016 Schowengerdt ......... G02B 6/32
2017/0243324 A1 * 8/2017 Mierle .................... G06F 3/012
2017/0309071 A1 * 10/2017 Benko .................... G06F 3/011

OTHER PUBLICATIONS

Azmandian et al., "Haptic Retargeting Dynamic Repurposing of Passive Haptics for Enhanced Virtual Reality Experiences", Human Factors in Computing Systems, May 12, 2016, pp. 1968-1979.
Cater et al., "Varying Rendering Fidelity by Exploiting Human Change Blindness", Proceedings of the 1st International Conference on Computer Graphics and Interactive Techniques in Austalasia and South East Asia Graphite 03, Feb. 11, 2003, pp. 39-46.
Simons et al., "Failure to Detect Changes to People During a Real-World Interaction", Psychonomic Bulletin & Review, Dec. 1, 1998, pp. 644-649.
Steinicke et al., "Change Blindness Phenomena for Virtual Reality Display Systems", IEEE Transactions on Visualization and Computer Graphics, Ieee Service Center, Los Alamitos , vol. 17, No. 9, Sep. 1, 2011, pp. 1223-1233.

* cited by examiner

*Primary Examiner* — Martin Mushambo
(74) *Attorney, Agent, or Firm* — Samuel I. Yamron

(57) ABSTRACT

Disclosed herein is a system comprising a display, at least one imaging device for capturing at least one user image of at least part of the user, a determination unit connected to the at least one imaging device, said determination unit being used for determining information relating to the user's eye based on the at least one user image. The system further comprises a scene renderer connected to the display and the determination unit, the scene renderer being used to generate a first image on the display, whereby the scene renderer is configured to generate at least a partially modified image relative to the first image in real time, without the user noticing, based on the information relating to the user's eye.

20 Claims, 12 Drawing Sheets

SYSTEMS AND METHODS FOR DISPLAYING IMAGES IN A VIRTUAL WORLD ENVIRONMENT

BACKGROUND OF THE INVENTION

In virtual reality environments where a user is typically experiencing a scene as an avatar (either from the first person viewpoint or from a third person viewpoint), for example in a three dimensional display or a simulator, the image shown in the display is sometimes modified for several reasons, for example in order to divert the user's attention, to introduce objects into the display, to coordinate activities within the display and so on. The display, in particular a three dimensional display, may be used to enhance the user experience by adapting the display to the user's physical movements, such as the user's head movements. Some of these modifications and changes can be noticed by the user leading to a user experience that is not smooth.

Further, in a virtual reality application, where a user is viewing a representation of an environment through a head mounted display, it is desirable to allow a user to move around within that environment, so as to simulate an actual real world situation. However, given that a user typically uses a virtual reality system within a confined space, it is desirable to provide a way for the user to move large distances in the virtual environment relative to the actual distance moved by the user in the real world environment.

In virtual reality applications, in particular when the display is a head mounted display, such modifications typically relate to world warping and body warping. A combination of world warping and body warping may further lead to the possibility of haptic retargeting when the user is supposed to grab a real object in order provide haptic feedback. This may be used when building a structure with cubes or the like. The terms world warping, body warping and haptic retargeting are herewith explained and in particular world warping and body warping are also further explained referring to the figures.

World warping, herein is related to the function of warping the virtual world in a head mounted display for instance to motivate the user to change or follow a desired movement path in the real world. It is preferable that world warping not take place while the user is consciously viewing the virtual world or at least part of it. Thus it is preferable that it take place either while the user is not actively viewing as explained later herein or it may take place when the user is looking away by turning his head away from—and back to a scene in the virtual world whereby the head rotation is also performed in the real world. Such systems have been previously discussed in the following: "Haptic Retargeting: Dynamic Repurposing of Passive Haptics for Enhanced Virtual Reality Experiences" by Mandi Azmandian, Mark Hancock, Hrvoje Benko, Eyal Ofek and Andrew D. Wilson (ISBN 978-1-4503-3362-7/16/05). In the mentioned prior art world warping, body warping and haptic retargeting is done by motivating the user to turn his head (world warping) or while a user's limb is moving (body warping). Hybrids of world warping and body warping may be performed but usually head rotation of the user is required, since the virtual world can only be warped when the user is not seeing at least part of the scene, which is being warped.

BRIEF SUMMARY OF THE INVENTION

It is possible to modify an image or change a scene in the virtual world without the user noticing using information relating to a user's eye and/or eye movements. Embodiments of the invention relate to the fact that the eye is actually not seeing everything even though the brain thinks that everything is continuously seen. There are many situations in which the eye does not see, the most obvious being blinking. Others include but are not limited to saccades, smooth pursuit of an object and in between changing focus from one object to another object. The idea is that these periods of time, during which the eye does not see or during which the brain does not record any image, can be used to modify an image displayed to the user.

In order to further explain embodiments of the invention, the terms "world warping," "body warping," and "haptic retargeting" are herewith further explained. World warping is typically done without the user noticing. World warping may be described, in a non-limiting example, as moving a virtual scene for example around an axis in the three-dimensional space (3D space) in order to change and influence the movement path of at least part of the user. In order to do that the virtual scene is either over- or under-rotated compared to the real world. Within certain boundaries this can be done without the user noticing, as long as the user does not see the actual world warp. World warping is typically done by taking into account the details shown in a current scene on the head mounted display. In particular objects and colors that are currently shown in the head mounted display are taken into account. For example, if a scene does not comprise many different colors, the determination unit may decide that it is a good time to warp the virtual world via the scene renderer (a unit which renders graphical information to be placed on a display). The same may be true if comparably few objects are present in the virtual world scene. If many different colors are and objects are present in the virtual scene, the scene renderer may decide to wait with the world warping; —since is very important that the user does not notice when the world is warped in order to provide a smooth user experience. Any warping may thus be performed within a threshold that ensure that the user can not notice the warping. World warping may further be coordinated with the movement of the user in the real world. A good moment for world warping may for example be when the user is rotating his body, torso or head or when he is turning his body, torso or head. Another good moment for world warping would for example be when the user is walking or even running, although running would potentially require some precautions to avoid the user stumbling and falling. The user's body movement is not limited to the aforementioned movements.

Body Warping, is relating to the warping of at least a body part in the virtual world in order to change a movement path or trajectory of the same body part in the real world without the user noticing. Body warping may for example be used to guide a user's hand towards a physical object or a specific position in the real world and the virtual world, whereby in the virtual world the user sees several of the same physical objects, while in the real world the physical object is always the same, as further explained below under haptic retargeting. Body warping may be performed in real time or delayed and without the user noticing, it is preferable that this occurs when the body part is moving slowly Thus the scene renderer may be configured to decide whether the body part should be warped or not upon detection of movement speed of said body part. The scene renderer may be configured to attempt to slow down the body part movement in the real world, for example by drawing the attention of the user in the virtual world to another object or point of interest or by distracting the user. This may be done for example by showing a TV, a bright event etc. in the virtual world on the head mounted display or it may be done by inducing a loud sound or by distracting the user in any other way. Body warping also includes guiding the body part along a desired movement path in the real world, along which desired movement path a body part of the user has to move in order to be able to grab an object in the real world for example. Said body part may also be shown in the scene on the head mounted display but warped in the modified scene, in order to keep the body part in the desired movement path in the real world. The virtual body part displayed in the head mounted display for example may be shown under- or overrated as seen from the user's perspective so that the user correspondingly changes the movement path of the body part in the real world. This can be done without the user noticing when done within reasonable boundaries.

Haptic Retargeting, herein haptic retargeting relates to the change of a movement path of the user in order to create haptics or tactile experiences for the user. Generally, the head mounted display is used to stimulate the visual sense of the user, sound may be used via loudspeakers or earphones to stimulate the hearing sense of the user and physical objects in the real world may be used to stimulate the tactile sense of the user. When using a physical object in the real world for example to build something with cubes in the virtual world, haptic retargeting may be used to provide the user with a tactile sense of the cube. For this purpose only one single cube may be used in the real world while the user gets to see a plurality of cubes in the virtual world arranged to form a bigger object, such as a house, a castle, a ship or any other real world structure. In order to build this virtual structure the user will grab after the physical object in the real world, such as the cube, and positions it in the virtual world in order to build the virtual structure comprising several objects/cubes. When the user is grabbing the next cube to continue to build the structure, the movement path of the body part of the user in the real world needs to be adapted to the position of the physical object. In order to do that the virtual world can be warped for instance via the scene renderer, using information relating to the user's eye while at the same time the body part, in this case the arm and hand of the user, may be displayed in a modified shaped and at another position, orientation or the like in the virtual world and thus in the head mounted display, which is not corresponding 100% to the actual position of the arm in the real world but over or under rotated around any axis in the three dimensional space. This way the arm and hand, respectively, is grabbing the same physical cube in the real world again, providing haptic feedback and a tactile sensation, although the mind of the user is now thinking that it grabbed another cube by trusting its visual sense. This is called haptic retargeting and is thus a combination of world warping and body warping.

Preferably, body warping requires a comparably slow movement of the limb. Even if the user is motivated to move his limb slowly for example by diverting the attention of the user using the image or scene currently displayed in the display. Such a distraction or diversion is technically difficult to achieve and it may cause disruption in the scene shown in the display, leading to a virtual reality experience, which is not smooth.

As can be understood and seen from the above, world warping using head movements can be cumbersome and in some situations even difficult to achieve, since the user has to be motivated to rotate or turn his/her head. Further even when the user is rotating or turning his/her head the modification of the scene or image may be noticed by the user when his gaze is focusing again on the scene that is/was modified. The need for the rotation of the head leads to a situation, in which the user cannot see a part of the virtual world so that this part of the virtual world, scene or image can be modified. Even though the modification may in some cases go unnoticed by the user, there are situations, in which the user observes a change when he/she is rotating the head back at the scene or image. This may also happen when haptic retargeting is used.

There is thus a need to improve the user experience in virtual reality applications and systems.

In one embodiment a system for displaying images is provided. The system may comprise a display, at least one imaging device for capturing images of at least one eye of the user, a determination unit connected to the at least one imaging device, said determination unit being used for determining information relating to the user's eye based on the at least one user image. The system may further comprise a scene renderer connected to the display and the determination unit, the scene renderer being used to generate a first image on the display. The determination unit may be configured to instruct the scene renderer to generate at least a partially modified image relative to the first image in real time, without the user noticing, based on the information relating to the user's eye.

In another embodiment a method for controlling a system in real time is provided. The method may include displaying a first image to a user, capturing at least one user image of at least a part of the user and determining information relating to a user's eye based on the at least one user image. The method may further include modifying the first image to generate at least a partially modified image relative to the first image in real time, based on the information relating to the user's eye. The modification of the first image to the at least partially modified image may be done without the user noticing.

In another embodiment, a non-transitory machine readable medium having instruction stored thereon for a method of controlling a system in real time is provided. The method may include displaying a first image to a user, capturing at least one user image of at least a part of the user and determining information relating to a user's eye based on the at least one user image. The method may further include modifying the first image to generate at least a partially modified image relative to the first image in real time, based on the information relating to the user's eye. The modification of the first image to the at least partially modified image may be done without the user noticing.

Hereafter several terms are used and provided in order to describe technical structures and components or actions. These terms are explained in the following, however these explanations are not intended to the definitive, only definitions of the terms. Rather these explanations are intended to assist with understanding various embodiments of the present invention, as examples.

Memory device, memory or memory device may herein refer to a hard drive, a solid state memory, cloud storage or network/server storage or any other type of data storage in connection with computers.

Network, cloud or virtual processor herein may refer to network and cloud based solutions. A processor may be a physical component configured to execute a software code. Alternatively it may be a virtual component, such as a virtual processor, which may for example be network based or cloud based.

Perimeter, herein the term perimeter may refer to a physical perimeter such as walls of a room or it may refer to a virtual perimeter such as movement path in the three dimensional space. The perimeter may describe physical requirements, physical range of motions or physical movement paths, within which the user has to remain in, in order to avoid crashing with real world obstacles or in order to make sure that during haptic retargeting the same physical real world object is grabbed again. The perimeter may be a range in which the user can move or it may be a wall of a room in the real world. Any object of the real world, such as a cliff, an edge, a tree, a body of water, a wall, another person or moving object may form part of a perimeter, which needs to be respected in order to guarantee the user experience and the user's safety.

"Eye or gaze information", herein the term eye or gaze information, or terms similar or including eye or gaze information, is intended to include at least one of a saccade, blinking, smooth pursuit of an object in the virtual world, fixation on object in the virtual world while the head of the user is rotating, or it may also refer to the period of time in between two fixation states of the eye, when the user's fixation shifts from one object in the virtual world to another object in the virtual world. The information relating to a user's eye may be information relating to a user's eye movement. During the described eye and/or head movement, at least a part of the display of the HMD cannot be seen by the user and the virtual world or virtual scene may be modified up to a certain degree. Any modification is thereby possible, body and/or world warping or a combination thereof. Alternatively the position of an avatar of the user (assumed herein to include a position of the user, either in first person or third person perspective) of the user may be changed. Thus the eye or gaze information may be used to change the image while the user cannot see at least a part of the image. This may be done during a very short time interval or a short period of time (sometimes referred to herein as a "moment in time"). While the eye is doing a smooth pursuit, thus while the eye is following an object on the head mounted display, the eye is seeing the object sharp but the background cannot be seen sharp or it may even pass unnoticed by the eye and thus such a smooth pursuit may also be used for world warping and/or body warping and/or for a modification of the position of the avatar of the user. In such a situation the modification of the object, which the user is following, would be avoided otherwise the user may notice the modification. The same situation may arise during rotation of the user's head while the user's eye is focusing on an object in the real world and while the user is changing focus from one object to another object in the virtual world. In all of these situations the user cannot see with his eyes or the brain is not recording any image at least a part of the display.

User's movement or pose, the user's movement is generally referring to the movement trajectory or path of the entire user. In an embodiment only parts, such as for example body parts of the user may be meant. The user is typically the person or persons wearing the head mounted display. The user's movement may also relate to a position of the user in a map or a route. The map may be a reproduction of the real world. The user's movement may for example be walking or running or it may only relate to the rotation of the head or another body part of the user or to a rotation of the entire user.

Object/Subject, herein the term object is used to describe an object in the virtual world. Since the items, objects, humans and animals illustrated in the virtual scene on the head mounted display are all not real, herein the term object encloses all of these items, objects, humans and animals. Thus when any modification, eye movement or situation in which the user cannot see is described herein by referring to an object, this object shall include all of the above.

BRIEF DESCRIPTION OF THE DRAWINGS

Embodiments of the present invention are described in conjunction with the appended figures:

FIG. 5b is a schematic illustration how the virtual position of the virtual body part is modified relative to the illustration of FIG. 5a;

DETAILED DESCRIPTION OF THE INVENTION

Figure 1:
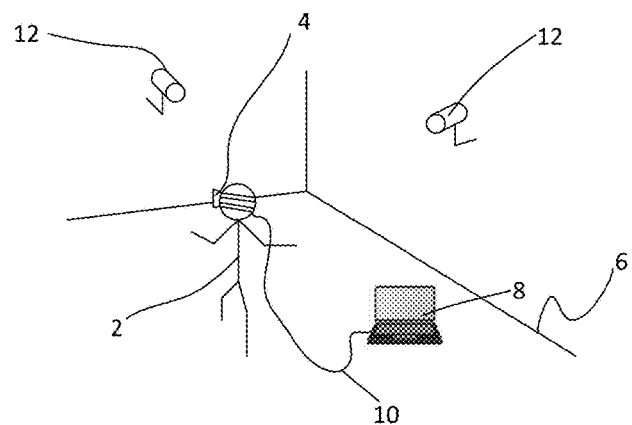
FIG. 1 is a schematic view of a user experiencing a virtual reality application.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Virtual reality applications sometimes require an image, which is shown in a display, to be modified so that the user's movement, pose or position can be influenced and changed or in order to create other visual effects. All modifications between a first image shown in the display and an at least partially modified second image shown in the display may occur when the user is not seeing at least a part of the first image or display. Not seeing may also relate to the brain not registering or recording any image during a moment in time. In order to determine moments in time, in which the user is not seeing at least part of the display, a camera or other type of imaging device may be used to capture a user image, from which user image eye information or gaze information can be extracted and determined via the determination unit. The user image may thus preferably comprise at least one eye of the user. Depending on the information provided by the determination unit, the scene renderer may then modify the first image and display the at least partially modified second image or it may decide that the current moment is not suitable or eligible for image modification. Criteria for such a decision of non-eligibility are explained later herein.

The first image may a first scene and the at least partially modified second image may be a second scene or modified scene. The first image and the at least partially modified second image may be displayed via the scene renderer.

The determination unit may further be configured to communicate with at least one tracking device in order to get information from the tracking device if a scene or image modification is necessary.

The tracking device may be any type of device that is able to detect motion, pose and/or position of the user wearing the head mounted display. The tracking device may be a camera, a laser emitting device, a GPS sensor combined with a camera or an infrared device. There may be several tracking devices used and even several tracking devices of different type. For many applications it may be beneficial if the sensor is working together with at least one reflector. The reflector may be a device that reflects the laser rays or laser beacons or infrared rays or it may be a reference object that is easy recognizable by a camera. The sensor may be mounted on the outer side of the head mounted display and reflectors may be positioned so that they for example indicate a perimeter of the room in which the user is moving in the real world. The reflectors may also be mounted on body parts of the user or on the head mounted display. In an alternative embodiment the sensor may be arranged so that it can track the movement, position and pose of the user, while one or several reflectors are mounted on the outer side of the head mounted display. Several sensors may be used to track user movement, pose and position. Further even hybrid solutions with one or several sensors on the outer side of the head mounted display and one or several sensor arranged so that they can observe the user when he is wearing the head mounted display may be suitable. Similarly reflector(s) may be mounted on the outer side of the head mounted display and on a perimeter, which perimeter limits the movement of the user in the real world. Further, reflectors may also be mounted at least on some of the user's body parts. The sensor(s) may for example be mounted to a wall of a room, in which room the user is moving. Similarly reflector(s) may be mounted on the head mounted display and the walls of such a room. The reflectors may be a light emitting diodes (LED). The light emitting diodes may be positioned on the head mounted display. For example the sensor(s) tracking the head mounted display may be light sensitive sensors and the room or space in which the user wearing the head mounted display is moving may be darkened or even dark for an easier tracking of the user.

The tracking device may be arranged on the user, on the display in particular the head mounted display or the tracking device may be positioned anywhere suitable, as long as it can track the user's pose, position and movement.

The tracking device may be positioned on at least part of the user's body, and/or on the HMD. The types of the tracking device includes any type of camera, laser emitting devices, IR-sensor or any combination thereof. It may even be possible to combine different types of tracking devices and to use more than one tracking device.

If the user is roaming in free space the tracking device may be located directly on the head mounted display for improved safety. Such a tracking device may for example detect, trees, bushes, cliffs, walls etc. and provide information to the determination unit that modification of the scene is required upon which information the determination unit is then detecting eye movement, eye information or gaze information to determine whether or not it is suitable for the scene renderer to modify the scene.

A system according to one embodiment of the invention may comprise the display, at least one imaging device, for example a camera, for capturing at least one user image of at least part of the user, the determination unit connected to the at least one imaging device, said determination unit being used for determining eye or gaze information based on the at least one user image. The system may further comprise the scene renderer connected to the display and the determination unit, the scene renderer being used to generate a first image on the display, whereby the scene renderer is configured to generate at least a partially modified image relative to the first image in real time, without the user noticing, based on the eye or gaze information.

In an embodiment several imaging devices or cameras may be used to track and capture user images of the user's eye or face.

The information relating the user's eye may be a moment in time, in which the user does not see at least a part of the first image displayed in the display. As mentioned previously this may also be a moment in time during which the brain is not registering or recording any image via the eyes.

In an embodiment the moment in time may be a time period needed for the eye to perform a saccade or the eyelid to perform at least a partial blink.

The moment in time may be a time period during which the focus of the user's eye is shifting from a first object shown in the first image to a second object displayed in the at least partially modified image, while the first object and the second object are displayed at least partially identical in the first image and the at least partially modified image. While the focus of the user's eyes is shifting from the first object to the second object, the user does not actively see at least a part of the display and thus she/he will not notice a modification if is it performed within a certain threshold. As described above, it should be noted that any reference herein to an object being displayed in both the first image and a subsequent image, even when display of the object is at least partially modified, should be presumed to be referring to the same object. Thus, while there may be some alteration of the object between subsequent images, it should be understood that the same object is being referred to.

The moment in time may be a time period during which the user's eye is focusing on the edge of the display or at least on a region close to the edge of the display.

The moment in time may be a time period during which the user's eye is following a moving object in a smooth pursuit on the display, whereby the moving object is shown in the first image and the at least partially modified image. During such a so-called smooth pursuit the user does mainly or only see the moving object and not the background of the first image and the at least partially modified image. This may in particular occur if colors and objects are correspondingly chosen. Similar colors and color shades in the first image and the at least partially modified second image may ease and simplify modification.

Although the above described moments in time are comparably short, the length of all this moments in time is enough for the scene renderer to communicate with the determination unit and potentially even with the tracking device and to modify the scene in real time.

The at least partially modified image may be a rotated or otherwise altered in relation to the first image. Said rotated image may be, but is not limited to, rotated around any axis in a three dimensional space, it may be shifted, zoomed in or out, distorted, etc. or any combination thereof.

The rotation may be relating to the rotation of the user's body and the rotation between the first image and the at least partially modified image may either be more or less than the rotation of the user's body. This over- or under-rotation may only be performed in a limited range, said range being determined by various parameters the most important being that the user does not notice the over- or under-rotation. Over- or under-rotation means that the first image or scene is rotated more or less than a rotation felt or performed by the user. The felt or performed rotation of the user may relate to his eye movement or body movement or a combination thereof. Thus the user is actually tricked into thinking that she/he rotated more or less than he actually did physically.

The scene renderer may determine, based on the content of the first image shown in the display, if displaying the at least partially modified image is currently eligible. The content may refer to the objects, movement and or color currently displayed in the first image. If the scene renderer considers the first image to be suitable for modification it may perform a modification if not it may communicate with the determination unit to receive a following moment in time during which the user does not see at least a part of another first image, whereby the scene renderer then determines again if this another first image is suitable for modification. These steps are repeated until the scene of first image can be modified.

The scene renderer may determine an eligibility of modification by determining characteristics of objects displayed in the first image, colors currently displayed in the first image or audio information currently played while showing the first image, before displaying the at least partially modified image. All these characteristics may be taken into account before the first image is modified to the at least partially modified image.

The characteristics of objects may comprise information regarding the amount of objects displayed in the first image, the movement of the objects displayed in the first image, a virtual distance between a virtual position of the avatar of the user and the objects displayed in the first image and/or relative distance between the objects displayed in the first image. As previously mentioned similar colors or color shades may be better suited for modification. Further a comparably small amount of objects may also be better suited for modification. A large amount of objects displayed in the first image may complicated modification but not exclude it.

The audio information may be audio information that is moving from a point A to a point B and it may relate to an object, which object is displayed at a first position in the first image and at a second position in the at least partially modified image, whereby the audio is following the object from the first position to the second position. The object may for instance be a moving vehicle, such as a plane, motorbike or car. In an embodiment the audio information may however move faster or slower than the displayed object. This can be helpful for modification of the virtual reality scene.

The at least partially modified image may comprise a warped virtual world in relation to a virtual world displayed in the first image, a warped virtual body part of the user in relation to a virtual body part displayed in the first image or a combination of the two. Virtual world warping and body warping are explained referring to FIGS. 3a-3e and FIGS. 5a-5c, respectively, later herein.

The system may be a wearable system and the display may be a head mounted display. There may however be applications where the above may be embodied in other systems such as tree dimensional movies and experiences or simulations. The above described system and below described method may however be in particular suitable for wearable systems for virtual reality applications.

The system may further comprise the tracking device for detection of a motion, a pose and/or a position of the user in a three dimensional space, said tracking device may be connected to the determination unit, the tracking device may further be configured to track the motion, pose and/or the position of the user in a real world.

The tracking device may detect whether or not the user is approaching a perimeter in the real world and whereupon the sensor may notify the determination unit if the user is approaching a perimeter and wherein the determination unit may be configured to instruct the scene renderer to generate at least a partially modified image in real time, without the user noticing, based on the eye or gaze information, if the user is approaching the perimeter. This may enhance the user's safety and avoid any sort of collision or other hazard.

The tracking device may detect if the user is standing, leaning, walking, running, moving his head or any other limb or any combination thereof.

The determination unit may identify the user based on the eye or gaze information prior to displaying the first image on the display. This may for example be information relating to the Iris-, facial features- and/or features of the peripheral eye region of an authorized user.

The eye or gaze information may comprise an eye movement of the user.

The warping of a virtual body part of the user may comprise the detection of a current position, pose or moving speed of the body part by the tracking device, whereupon the scene renderer may display the body part as a virtual body part of the user in the first image and wherein the at least partially modified image may comprise the warped virtual body part. This is further illustrated in FIGS. 5a-5c.

The first image may comprise information relating to a position of the avatar in the virtual reality display and thus to the position of the avatar of the user. The avatar's position may be teleported in the at least partially modified image. Prior to changing a position of the avatar of the user the scene renderer may determine if modifying the position of the avatar is eligible and suitable. The decision to teleport the position of the avatar may depend on the distance between the user and a physical object such as a wall. While the head mounted display is in use the scene renderer may continuously determine if the first image or first scene currently displayed in the display is suitable for modification. Thus also the determination of a distance between the position of the avatar and the physical object is continuous and ongoing while the head mounted display is in use. Modification of the avatar's position in the display and a virtual object and a user's position and a real object may be done progressively, meaning that the distance between the avatar and the virtual obstacle and the distance between the user and the real obstacle is reduced faster (or slower) in the display compared to reality. The unit or amount of modification of distance may thereby be adapted depending on the obstacle or object the user is moving towards. In addition the distance between a first position of the avatar and a second position of the avatar may be adjusted according to the user's speed of movement. Walking may lead to a larger distance between the first position of the avatar and a second position of the avatar, while running may lead to a smaller distance between the first position of the avatar and a second position of the avatar. Running may thus lead to more changes in the position of the avatar, since the steps of change or modification may be smaller. Thus the distance between position of the avatar and modified position of the avatar. Also here the limit is always the criteria that the user must not notice the teleportation. Changing or modifying the position of the avatar may be in particular suitable while the user is moving. The user is less likely to notice a teleportation in the position of the avatar when he or she is moving at the same time, of course given that the modification takes place while the user does not see the modification and thus at least a part of the first image or a part of the scene currently displayed in the display.

In an embodiment the scene renderer may actively introduce at least one moving or steady object or color into the scene in order to facilitate the modification of the scene. This may be done when the modification is urgent and of importance, for example when a collision in the real world between the user and a physical obstacle becomes likely. Additionally audio or other visual effects, for example unexpected flashes or other surprising effects, may be induced in the first image in order to induce an eye movement and thus a moment in time during which the user does not see at least a part of the first image.

The perimeter may be formed by at least one physical obstacle in the real world. In an embodiment the perimeter may further be formed by at least one desired movement path in the real world, along which desired movement path at least a part of the user's body shall to move. The at least one desired movement path in the real world may be the desired movement path for a body part of the user, whereby said body part may also be shown in the scene on the head mounted display and wherein said body part is warped in the modified scene, in order to influence the movement path of the body part in the real world. Alternatively the perimeter may be a desired movement path along which the user should walk or run.

The first image and the at least partially modified second image or the scene may be transferred wirelessly from a processor or computer to the head mounted display.

Turning now to FIG. 1, which illustrates a user 2 wearing a head mounted display 4. The user 2 is positioned in a tracked space 6. The head mounted display 4 is connected to a computer 8 or a processor and a memory via a cable 10. The cable 10 may be used to transfer images and/or to provide power to the head mounted display 4. The tracked space 6 may be a living room. On the walls, which walls form a boarder of the tracked space 6, tracking devices 12 are positioned, which tracking devices 12 keep track of the user 2 while he/she is immersed in a virtual reality world displayed in the head mounted display 4. The tracking devices 12 may be used to ensure the user's 2 safety. Depending on the image shown in the head mounted display 4, the user may turn, walk, run, crouch, move a body part or any combination thereof. In other words the user 2 may move in the tracked space 6 and there is thus a risk for collision, for example with the walls delimiting the space or any other physical obstacle such as a chair, furniture or even another person. These physical obstacles and walls define a perimeter in which the user can move. In order to avoid a collision of the user 2 with a physical obstacle, world warping, body warping or teleporting the avatar may be applied, when the user 2 is not seeing at least a part of the head mounted display 4. World warping will be explained further referring to FIGS. 3a-3e, teleporting will be explained referring to FIGS. 4a and 4b and body warping will be explained referring to FIGS. 5a-5c.

In FIG. 1 the user 2 is holding two reflectors 15, which reflectors 15 can be easily recognized by the motions sensors 12. The head mounted display 4 may further comprise reflectors (not shown) on an outer side so that the tracking devices 12 can track the movement of the head mounted display 4. The reflectors may be characteristically shaped objects, LED's or laser reflectors. In an alternative embodiment (not shown) the reflectors may not be present. The tracking devices 12 may work with laser beacons and thereby track the user 2. In some cases these laser beacons may lead to the reflectors being obsolete. Alternatively, the tracking devices 12 may be cameras configured to track the pose, position or movement of the user 2.

Although the motions sensors 12 in FIG. 1 are illustrated as being mounted to walls of the tracked space 6, the tracking devices 12 can actually be directly mounted on an outer side of the head mounted display 4 (not shown). Such tracking devices could observe the surroundings of the user 2 and provide information about certain collision risks or other dangers. This may be useful when the user 2 is not moving in a confined tracked space 6 but rather roaming free for example anywhere outside such as in a city environment, park or in nature. Further even though two tracking devices 12 are shown, one single tracking device may be enough to track the position, pose and/or movement of the user 2.

Further, FIG. 1 illustrates the head mounted display 4 being connected via a cable 10 to a computer 8. It is however conceivable, that the computer 8, thus the processor and memory is directly integrated in the head mounted display 4. The head mounted display 4 may alternatively communicate wireless via wireless protocol or Bluetooth™ with the computer or a network/cloud. In between the computer 8 and the head mounted display 4, a buffering unit 14 may be arranged. The buffering unit 14 may comprise a processor and memory. The buffering unit 14 is used to buffer images between the computer 8 and head mounted display 4. These buffered images may be used if necessary or required when scene modification is urgent or when the images shown on the display need to be replaced for any reason.

Figure 2A:
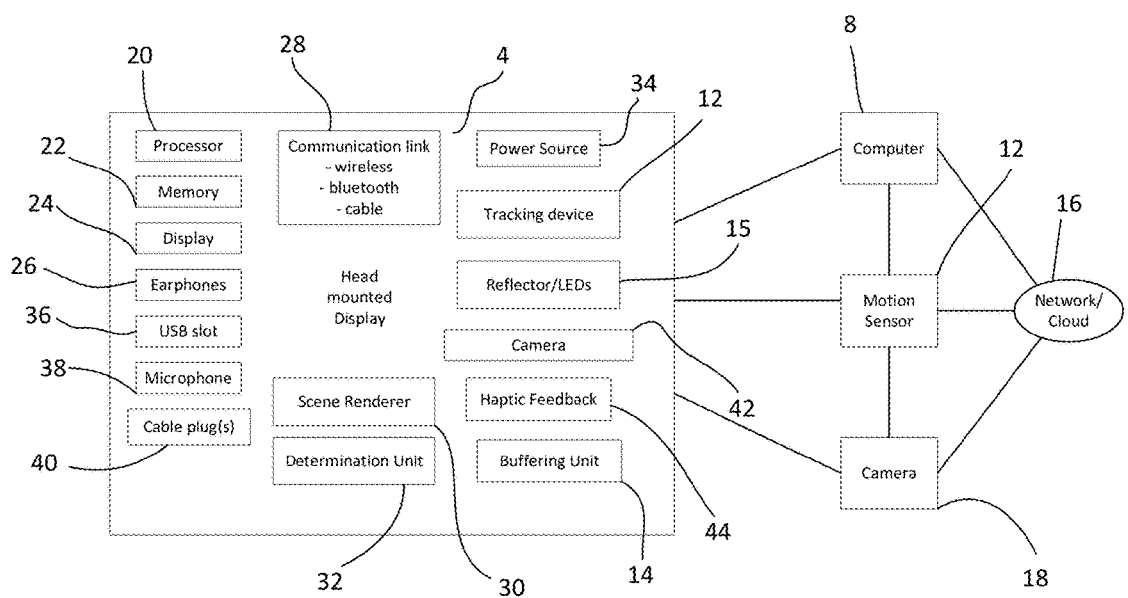
FIG. 2a is a schematic illustration of a system according to embodiments of the invention.

FIG. 2a illustrates a system according to one embodiment of the invention comprising the head mounted display 4, the computer 8, a network/cloud 16, the tracking device 12, which may be a camera 18 or which tracking device 12 may comprise the camera 18. The computer 8 is illustrated as a separate component in FIGS. 1 and 2a; it may however also be integrated in the head-mounted display 4.

The head mounted display 4 may comprise one or more processors 20, one or more non-transitory memories 22, a display 24, earphones 26, a communication link 28, a scene renderer 30, a determination unit 32 and a power source 34. The head mounted display 4 may further comprise a USB slot 36, a microphone 38 and further cable plugs 40 or the like. As previously mentioned, the head mounted display 4 may further comprise at least one tracking device 12 such as a depth camera that is position on an outer side 19 (FIG. 2b) of the head mounted display 4 and that is configured to do inside-out tracking. In such a case the head mounted display may actively create a three dimensional model of the surroundings. The head mounted display 4 may further comprise an imaging device 42 such as for example a camera 42, which camera 42 may be configured to take at least one user image while the head mounted display is worn by the user 2. There may be more than one imaging device 42 in order to provide redundancy and/or a better user image. The camera 42 may be any suitable camera. The camera 42 may preferably be positioned so that it can capture at least a part of the user's 2 eyes. Preferably the camera 42 may be positioned anywhere around an edge of the display 24. The head mounted display 4 may further comprise means 44 to provide haptic feedback.

The tracking devices 12 may belong to a camera system that further comprises markers or the like and controllers. The controllers may be held by the user 2 and the markers may for instance be attached to physical obstacles in the tracked space 6. The tracking devices 12 used in such a camera system may preferably be cameras, for example depth cameras.

The head mounted display 4 may be connected to the computer 8, the tracking devices 12 and/or the camera 18 by the communication link 28. The computer 8 may not be needed and the head mounted display 4 may be connected to a network 16 or cloud directly via the communication link 28. Alternatively the mounted display may be indirectly connected to the network 16 or cloud for example via the computer 8 and the communication link 28. In the head mounted display 4 a buffering unit 14 may further be integrated.

While many of the components described above in relation to FIG. 2a may be optional, the head mounted display 4 preferably comprises the processor 20, the memory 22, the display 24, the scene renderer 30, the determination unit 32, the communication link 28, the power source 34, which may be a power connection to the grid or a battery, and at least one camera 42 or imaging device 42. These components may be interconnected with each other so that they can communicate with each other within the head mounted display 4 and with the at least one tracking device 12. Any combination of different configurations of a head mounted display comprising the named components in this paragraph and the other not-named components in this paragraph may be conceivable and may be considered to fall within the scope of various embodiments of the invention.

The buffering unit 14 may be arranged within the head-mounted display 4 as shown in FIG. 2a. The buffering unit 14 may comprise a processor and memory. The buffering unit 14 is used to buffer images between the computer 8 and head mounted display 4. These buffered images may be used if necessary or required when scene modification is required and when additional images are necessary.

Figure 2B:
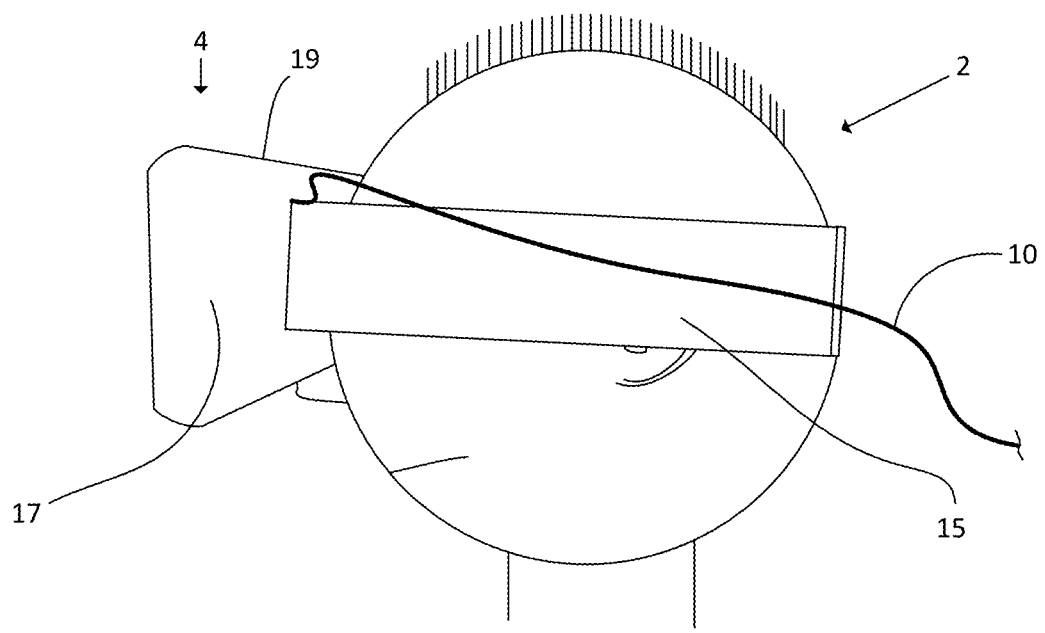
FIG. 2b is a schematic illustration of a head of a user wearing a head-mounted display.

FIG. 2b illustrates a user 2 wearing a head mounted display 4. The head mounted display 4 comprises a band 15 for fixation of the head mounted display 4 on the user's head. Partially visible in FIG. 2b is the cable 10 that provides the head mounted display 4 with energy and/or data. Referring to FIGS. 2a and 2b the components head mounted display 4, determination unit 32, scene renderer 30 and imaging device 42 are herewith further explained in detail:

Head-mounted display 4 (often referred to as a HMD); a head-mounted display 4 is typically used in a virtual reality environment to give the user the visual feeling of being and moving in a virtual world. A head-mounted display 4 is typically a display device worn on a user's head. In other embodiments a head-mounted display 4 may be a part of a helmet. The head mounted display 4 typically comprises a head gear having straps 15 and bands 15 or the like, whereby said head gear is then mounted on the user's head so that the display 24 is in front of his/her eyes. In many cases the display 24 is shielded from outside influences in particular outside light by using blinds or the like, whereby said blinds 17 (FIG. 2b) extend from the face of the user 2 to the display 42. The head mounted display 4 may comprise audio output that can be connected to the user's ears when the head mounted display 4 is set in place on the user's head. The audio output may be used to acoustically enhance the user experience in the virtual reality world, while the display is visually enhances the user experience in the virtual reality world. Further, the head-mounted display 4 may comprise an audio input, for example a microphone 38. The head mounted display 4 may further be connectable via a cable 10, wireless or Bluetooth™ to a processor, for example a computer 8 or it may be connectable to a virtual processor in a network, for example in a cloud. Alternatively the head mounted display 4 may comprise an integrated processor 20 and integrated memory 22. Said processor 20 and memory 22 may be used to generate the images of the display 24 and/or the sound of the earphones 26. In one embodiment the head mounted display 4 may comprise at least one imaging device 42 or camera positioned so that the camera 42 can observe at least one of the user's eyes. Preferably the camera 42 is used to observe both of the user's eyes. The image sensor of the camera 42 may use global shutter or rolling shutter. Furthermore, the camera 42 can be defined to include multiple image capture devices (e.g. stereoscopic pair of cameras), an IR camera, an RGB camera, a depth camera, and combinations thereof. The imaging device(s) 42 may be connected to the processor(s) 20. The head mounted display 4 may further comprise one or more tracking device(s) such as an optical sensor, camera or radar device, which observe the environment around the user 2. Such an optical sensor, camera or radar device 12 may be preferably positioned on an outer side 19 (see FIG. 2b) of the head mounted display 4. Alternatively to the tracking device the head mounted display 4 may comprise devices or components, for example markers, that are easily recognizable for a tracking device such as an optical sensor, a camera or a radar device. Such a device or component may be arranged on the outer side 19 or the head mounted display 4. The device or component may for example be motion sensitive hardware, such as magnetometer, accelerometer, EKG/ECG, a gyroscope, camera, Bluetooth or Bluetooth Low Energy beacon, a laser emitting device or a GPS sensor. The device or component may also be located on another part of the user such as on her/his body. This may ease the tracking of the user 2 in the real world environment. Any combination between tracking devices and markers may of course be possible. In order to provide redundancy at least one tracking device and at least one marker may be mounted on the outer side of the head mounted display 4. The outer side 19 of the head mounted display may be described as the visual parts of the head mounted display when the head mounted 4 display is worn by a user, as for example indicated in FIG. 2b. The display 24 itself of the head mounted display 4 may be an integrated display, specially developed for virtual reality applications, or it may be a smart phone that can be inserted into the head mounted frame so that the display screen of the smartphone is used as the HMD's display. Preferably, the display of the smartphone is a capacitive touch sensitive display that supports close-proximity touch. In case a smartphone is used it may even be conceivable to use the camera of the smartphone as imaging device. In case a smart phone is used the processor of the smartphone may be coupled to a further processor in order to render the virtual reality image onto the smartphone and/or in order to control the earphones. In a special case, since the display of the smartphone supports close-proximity touch, the display itself of the smartphone may be used as an eye or gaze tracking input device if the display is positioned in a position, within the maximum proximity touch range, in relative to the user's eye (s). The head mounted display 4 may further be powered via an energy network by cable or it may comprise an onboard power source, such as a battery. In addition the head mounted display may further comprise an accelerometer and/or a gyroscope to measure acceleration and movements. The head mounted display 4 may further comprise a camera as tracking device, said camera observing the surroundings of the head mounted display, such as for example a depth camera, which can monitor and recognize the three dimensional space and motion. The head mounted display may further comprise an audio input and or output as previously described. The audio output may be used for loudspeakers of any kind and the audio input for example for a microphone 38. In some embodiments the head mounted display 4 may comprise a USB-slot and a card reader slot. It is further conceivable that the head mounted display 4 comprises a vibration device or the like in order to provide tactile feedback.

Imaging device 42; the imaging device 42, which is used in the head mounted display 4 for tracking the movement of the user's eyes may be any type of camera or any other sort of light or heat-sensitive sensor that can be used to track movements of the user's eyes, preferably, such as for near infrared (NIR) camera or the like. Optionally, one or more line sensors like IC Haus LF3C could also be used for eye tracking. The imaging device may be an eye tracking device. As mentioned previously, the imaging device is preferably mounted on an inner side of the head mounted display 4, which inner side may be described as the space enclosed by at least a part of the user's face on which part the head mounted display 4 is positioned, the blinds, and the display 24 itself and any frame around the display, when the head mounted display 4 is worn by a user.

Determination unit 32; the determination unit 32 may comprise one or more processors or virtual processors located for example in a network such as a cloud. The determination unit 32 may further comprise memory. The memory may be part of the determination unit 32 or it may also be provided as virtual memory in a network/cloud. The determination unit 32 may consist of hardware and software code and either be integrated in the head mounted display 4 or at least be connected to it. The connection may be done via a cable, wireless connectivity or Bluetooth™, to the head mounted display 4. The determination unit 32 may further be coupled to the imaging device 42 or imaging devices. The determination unit 32 may be used to determine eye or gaze information based at least in part on at least one user image captured by the first imaging device 42. The information may comprise time and timing of saccades, blinks with the eyelids, smooth following of an object in the display, steady eye focus while the head is moving and change of focus of the eye for example from one object to another object. It is possible to predict the behavior of the second eye by only monitoring and extracting information from the first eye. Thus theoretically the determination unit 32 is capable to extract information relating to the user's eye or gaze information also if the image captured by the imaging device 42 only comprises one eye of the user. The information extracted from the image as described is then used by the determination unit 32 to pass on to a scene renderer 30.

Scene renderer 30, the scene render 30 may comprise a processor, memory and software code. The processor and memory may be physical elements arranged in a computer 8 or they may be located in a network or in a cloud. In addition the processor and memory of the scene renderer 30 may be physical elements or virtual. The software code may be stored on the memory and being executable by the processor. The scene renderer 30 generates a sequence of display images, which display images are sown in the head mounted display 4 in order to create a scene for the user in the virtual world. The scene renderer 30 may be coupled to the head mounted display 4, for example by a wired connection (e.g. cable), wireless connection (e.g. Bluetooth™). The scene renderer 30 may further comprise a display image generator unit or buffering unit 14 that generates additional display images for buffering in case a situation arises where additional display images are necessary for modifying the scene. This buffering unit 14 may be software code combined with hardware such as a processor and memory. The buffering unit may be integrated in the scene renderer 30 or it may be positioned in between the scene renderer and the head mounted display.

Figure 3A:
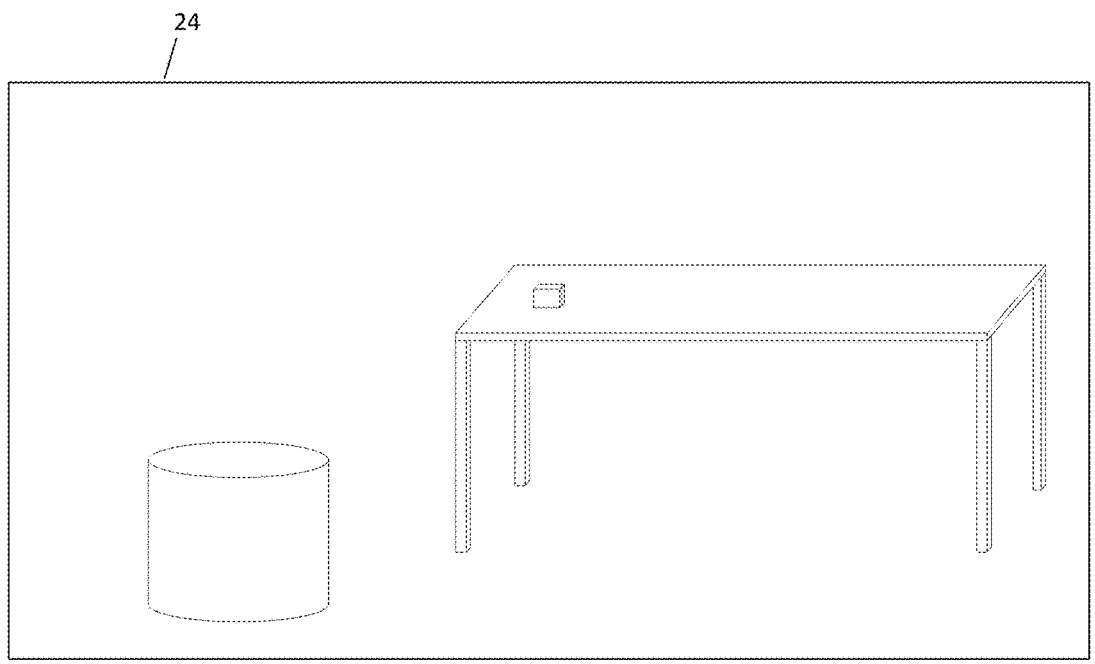
FIG. 3a is a schematic illustration of a first image shown in a display.

FIG. 3a illustrates the first image currently displayed on the display 24 comprising a stool, a table and a cube positioned on the table. By means of this comparably simple first image various modifications relating to world warping will now be described, thereby it needs to be noted that the modification are illustrated easily visible for understanding purposes in the figures. In the virtual reality application this modifications will not be visible since they are performed within certain parameters and boundaries and since they performed in a short moment in time.

Figure 3B:
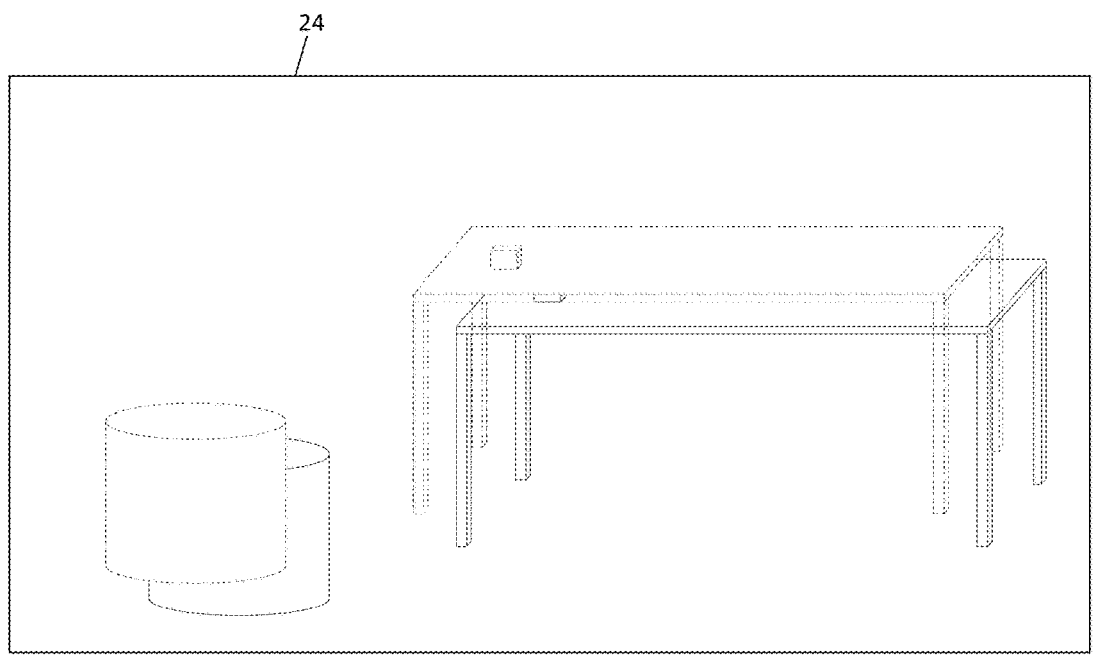
FIG. 3b is a schematic illustration of an at least partially modified image, which is modified relative to the first image shown in FIG. 3a, shown in the display.

FIG. 3b illustrates an at least partially modified second image relative to the first image illustrated in FIG. 3a, in which modified image the objects, thus the stool, the table and the cube are shifted. The dashed lined table, cube and stool indicate the shifted position. In the actual application the dashed lined would be the stool and table displayed in the at least partially modified image, while the table, cube and stool illustrated with an extended lined would not be displayed. The stool, cube and table shown in extended lined is only shown in FIG. 3b for understanding purposes.

Figure 3C:
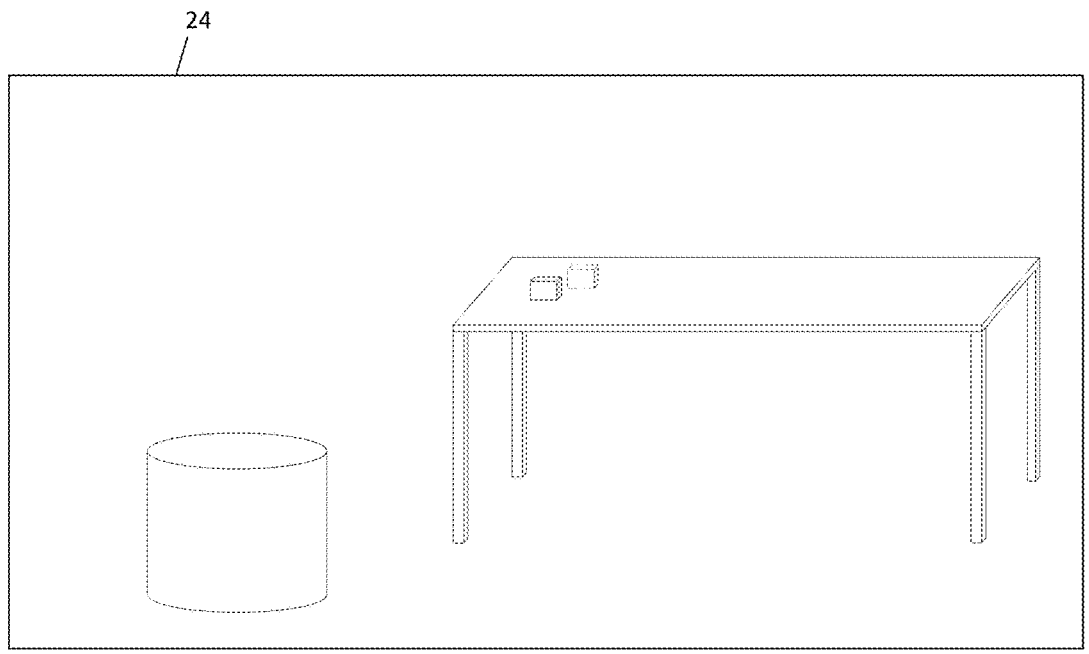
FIG. 3c is a schematic illustration of another at least partially modified image, which is modified relative to the first image shown in FIG. 3a, shown in the display.

FIG. 3c illustrates another at least partially modified image relative to the first image illustrated in FIG. 3a, in which modified image only the position of the cube was shifted, whereby the cube in dashed line illustrates the modified cube and thus the at least partially modified image. Again the cube illustrated in the extended line would not be shown in the modified image only the cube in dashed line.

Figure 3D:
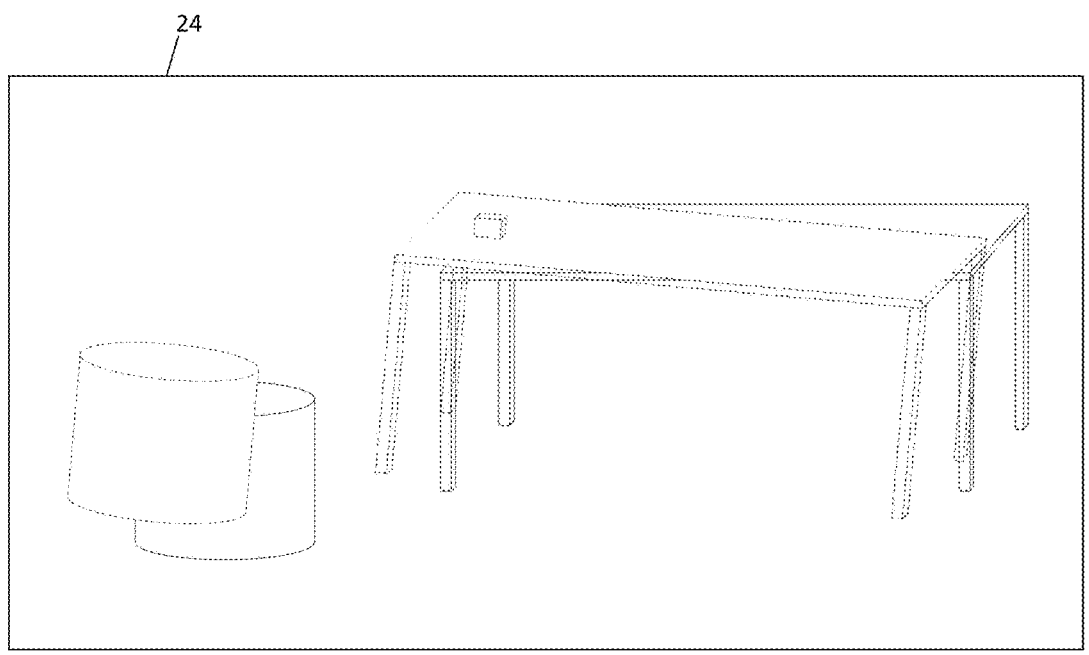
FIG. 3d is a schematic illustration of still another at least partially modified image, which is modified relative to the first image shown in FIG. 3a, shown in the display.

FIG. 3d illustrates a further at least partially modified image relative to the first image illustrated in FIG. 3a, whereby the content of the first image is rotated around an axis in order to generate the at least partially modified image. The axis may be any axis in the three dimensional space. FIG. 3d is a simplified illustration and the perspective proportions of the rotated stool, cube and table are not adapted to the rotation for reasons of simplicity.

Figure 3E:
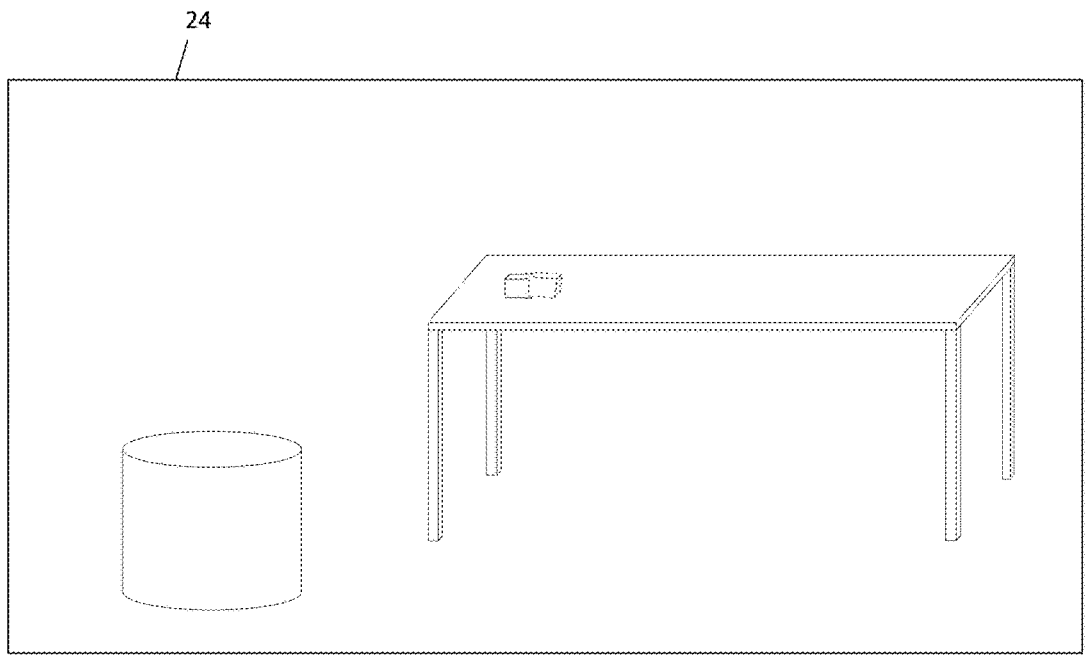
FIG. 3e is a schematic illustration of a further at least partially modified image, which is modified relative to the first image shown in FIG. 3a, shown in the display.

FIG. 3e illustrates a further at least partially modified image relative to the first image illustrated in FIG. 3a, in which only the cube on the table was shifted and rotated. Also in this case only the cube illustrated with dashed lines would be shown. The cube shown in extended lines is only shown for illustrative purposes.

FIGS. 3a-3e schematically describe potential modifications relating to world warping. It is clear that other modifications and combinations fall within the scope of various embodiments of the invention. All these modifications are shown and illustrated exaggerated in FIGS. 3a-3e for understanding purposes. In the application and system, there may be several modifications performed in a short time intervals, for example during fractions of a second, whereby the modifications between the first image and the at least partially modified image may be small but many, leading to a high effect and for example to an amended movement path of the user 2 while he is enjoying the virtual reality world. All of the described modifications in FIGS. 3a to 3e may be done while the user is not seeing at least a part of the display, as previously described herein. The user may for instance be induced by a color or any other means to focus on a specific object such as the stool in the first image of FIG. 3a, while the cube is moved to the position shown in FIG. 3e.

Figure 4A:
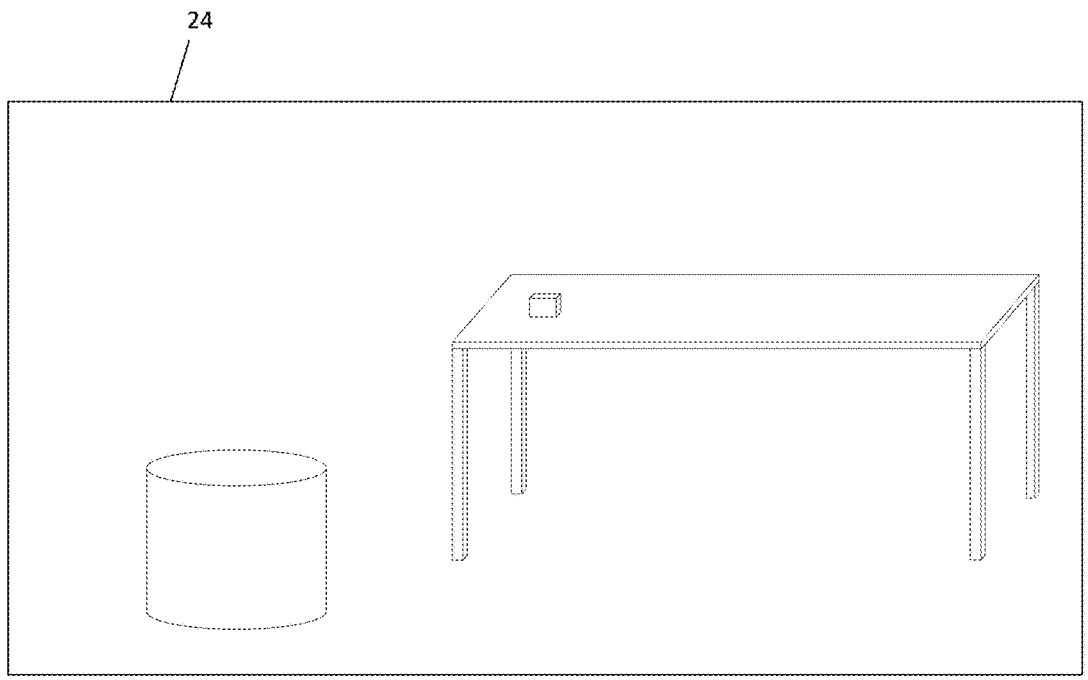
FIG. 4a is a schematic illustration of another first image shown in the display.
Figure 4B:
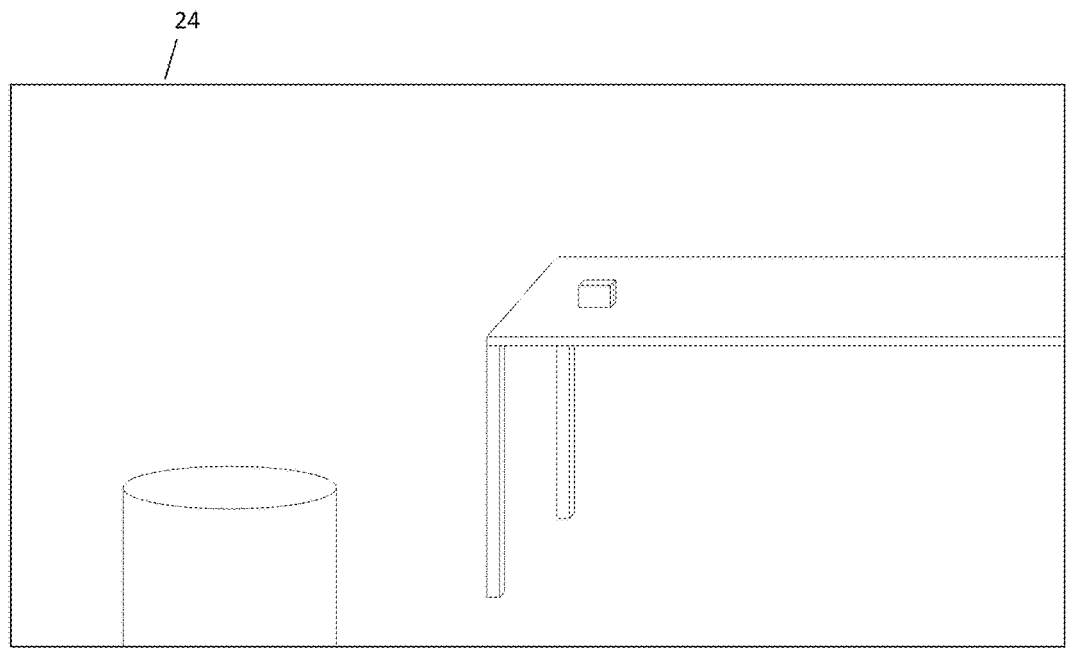
FIG. 4b is a schematic illustration of an at least partially modified image, which is modified relative to the first image shown in FIG. 4a, shown in the display.

FIG. 4a and FIG. 4b illustrate how the position of the avatar of the user can be modified in between the first image shown in FIG. 4a and the at least partially modified image shown in FIG. 4b. As can be seen the user is standing virtually closer to the stool and table in FIG. 4b than in FIG. 4a. As one can image modifying the position of the avatar between the first image and the at least partially modified image based on eye or gaze information may be useful in many situations as previously described herein, for instance when the user is approaching a physical obstacle or perimeter. As mentioned previously, the modification of the position of the avatar can be done while the user is not seeing at least a part of the display 24.

Figure 5A:
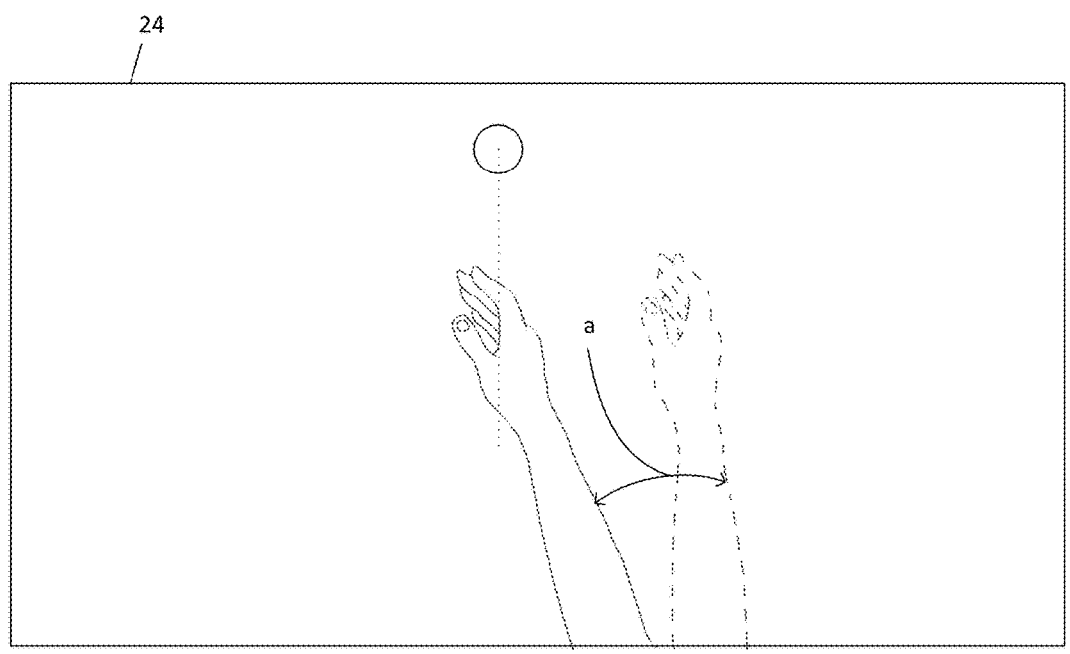
FIG. 5a is a schematic illustration of still another first image comprising a virtual position of a virtual body part versus a real position of a body part.
Figure 5B:
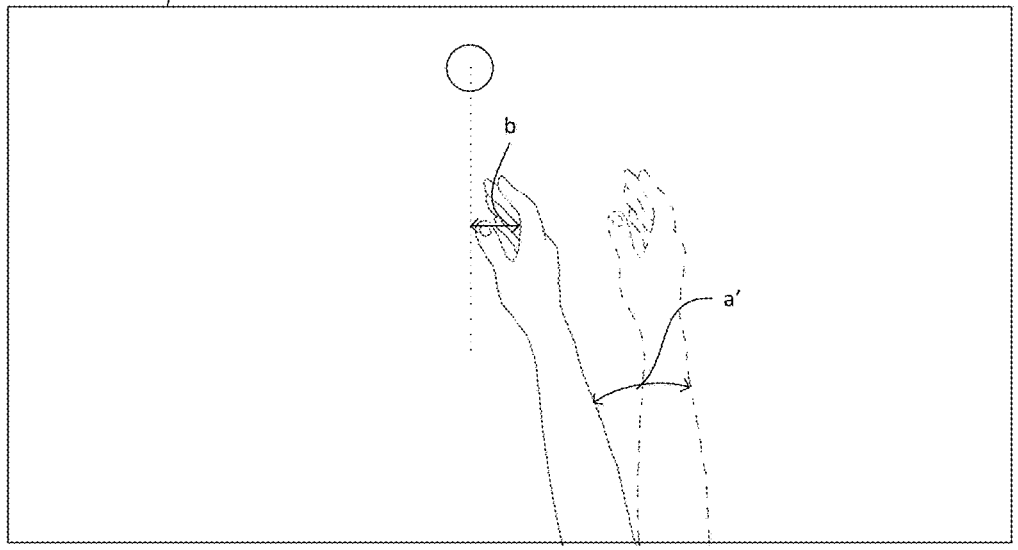
Figure 5C:
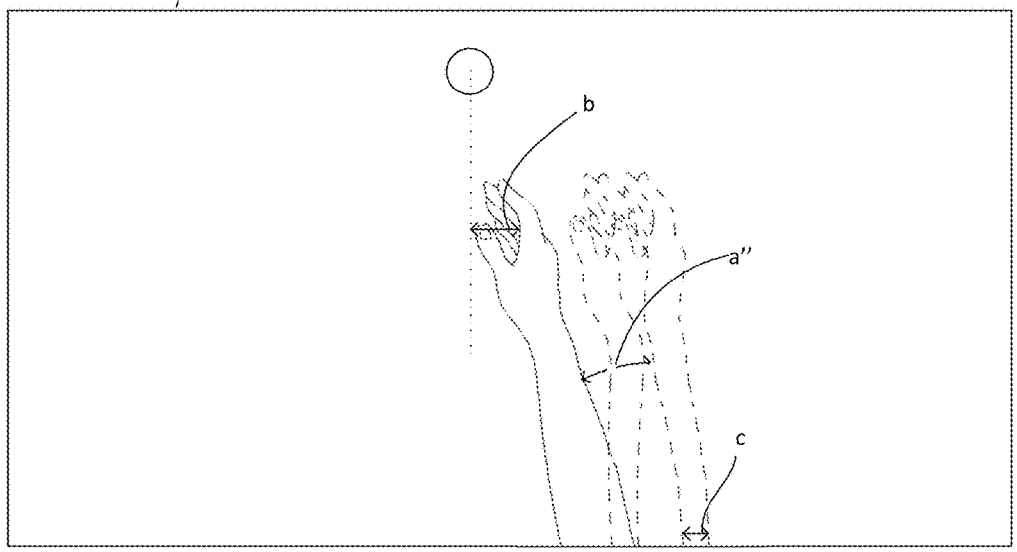
FIG. 5c is a schematic illustration how the user adjusts the real position of the body part in view of the modified virtual position of the virtual body part.

FIGS. 5a-5c illustrate body warping and haptic retargeting using a ball and an arm with a hand illustrated in the first image on the display 24. The virtual arm and hand is illustrated with an extended line, while the real arm and hand as positioned in the real world is shown in a dashed line. FIG. 5a illustrates how the position of the virtual arm and hand differ from the real position of the arm and hand. The position of the virtual ball corresponds to a physical position of a real ball, for example positioned on a surface, which the user can reach. Such a physical ball may be used to provide haptic feedback to the user. As can be seen from FIG. 5a the arm and hand in the real world would not grab the physical ball since the arm is not aligned with ball. The real arm is shifted and rotated by an angle a relative to the virtual arm. In order to correct the movement of the arm and eventually the hand, the scene renderer 30 may modify the position of the virtual arm as illustrated in FIG. 5b by shifting the virtual arm by a distance b and by rotating it slightly to generate an angle a', which is smaller than the original angle a. The shifting and rotating of the arm will cause the user to change the position of his real arm since the user trusts his visual sense the most. The user will thus shift his arm, for example by a distance c, as shown in FIG. 5c, and also rotate it at the same time in order to reduce the original angle a further to an angle a". As can be seen from FIG. 5c the real arm moves closer to the virtual arm. If the above step is repeated while the user is moving his arm and hand towards the ball, the real arm and hand will eventually be aligned and the user will grab the physical ball, while the virtual arm and hand also grab the virtual ball at the same time. In order to provide accurate modifications at least one tracking device 12 for instance an outward facing depth camera, may be used to track the arm and hand in the real world. The outward facing depth camera may also provide information the to the scene renderer 30 regarding the position of the real body part, in this case the arm and hand, and moving speed of the real body part. Body warping as described relating to FIGS. 5*a*-5*c* works well with slow movements. In an embodiment the outward facing depth camera may for example be positioned on an outer side 19 of the head mounted display.

Even though body warping, world warping and teleporting have been described independent of each other, it falls within the scope of various embodiments of the invention to combine these techniques in any way with the ultimate goal to provide a smooth and real user experience. Since these techniques are applied always in relation to the information based on the user's eyes and in particular when it is detected that the user cannot see at least a part of or the entire first image and the display, respectively, the user will not notice the modifications and he or she will have a very smooth user experience.

In the above it has been described how eye information and/or gaze information can be used to trigger world warping, body warping, avatar position change and haptic retargeting. These modifications depend on the actual extent and characteristic of the eye and gaze information. Table 1 below, gives an indication about these characteristics and thresholds:

In the above FOV relates to field of view. The left columns describe the eye movement and classification, the middle column the direction of the eye movement as seen in view of the display 24 and the right column describes the threshold for modification. Thus every eye movement above the limit described in the left column allows for modification of the scene. The method steps indicated in the table 1122 and 1022 relate to the method steps illustrated in FIG. 8.

Table 2 illustrates thresholds of the eye movements in relation to body positions or movements:

TABLE 2 classification and description of eye movement and threshold in relation to body position/movements.

| Body Movement Classification of Virtual Reality Scene | Direction of Eye Movement | Rate/Amplitude of Movement |
|---|---|---|
| Standing Still | Leaning Left | Exceeds 10-15 degrees |
|  | Leaning Right | Exceeds 10-15 degrees |
|  | Leaning Backward | Exceeds 10-15 degrees |
|  | Leaning Forward | Exceeds 10-15 degrees |
| Still at Head Movement while standing still or body moving | Circling/Rotating | Slow/medium/fast speed (1) Exceeds a predefined rotation degree; or (2) After head rotation the field of view changes, e.g., pass/replace the previous field of view |
| Complete Stand Still | Zero Movement | Zero Movement |
| Moving | Casual Walk | About 1.4 m/s |

TABLE 1 classification and description of eye movement and threshold.
S1122: TYPES OF EYE MOVEMENT

| Eye Movement Classification Of Virtual Reality Scene | Direction of Eye Movement | Rate/amplitude of Eye Movement for S1123 |
|---|---|---|
| Blink | Opening <-> Closing | Exceeds 50% eye closure |
|  | Opening <-> Closing | Blinking speed: slow/medium/fast, exceeding threshold = slow/medium blink |
| Saccades | Left to right | Moving distance exceeds 30-50% FOV in horizontal direction |
|  | Right to left | Moving distance exceeds 30-50% FOV in horizontal direction |
|  | Top to bottom | Moving distance exceeds 30-50% FOV in vertical direction |
|  | Bottom to top | Moving distance exceeds 30-50% FOV in vertical direction |
|  | Diagonal direction | Moving distance exceeds 30-50% FOV in Diagonal direction |
| Fixation at an virtual object (with at least one eye) | — | Over 2 seconds |
| Fixation to the edge of FOV of HMD | — | Over 0.5 seconds |
| Smooth pursuit at an virtual object | Left to right | Moving distance exceeds 30-50% FOV in horizontal direction; or pursuit for over 1 second |
|  | Right to left | Moving distance exceeds 30-50% FOV in horizontal direction; or pursuit for over 1 second |
|  | Top to bottom | Moving distance exceeds 30-50% FOV in vertical direction; or pursuit for over 1 second |
|  | Diagonal direction | Moving distance exceeds 30-50% FOV in vertical direction; or pursuit for over 1 second |

Please note:
during the fixation and smooth pursuit, the object can be a physical object if in an augmented reality environment. For example, the user is holding his/her finger in front of the AR glasses/HMD or the like TABLE 2-continued classification and description of eye movement and threshold in relation to body position/movements.

| Body Movement Classification of Virtual Reality Scene | Direction of Eye Movement | Rate/Amplitude of Movement |
|---|---|---|
| | Running Forward | About 4.47 m/s |
| | Running Backward | About 4.47 m/s |

In Table 2 the values of the threshold relate directly to user's position or moving speed.

Figure 6:
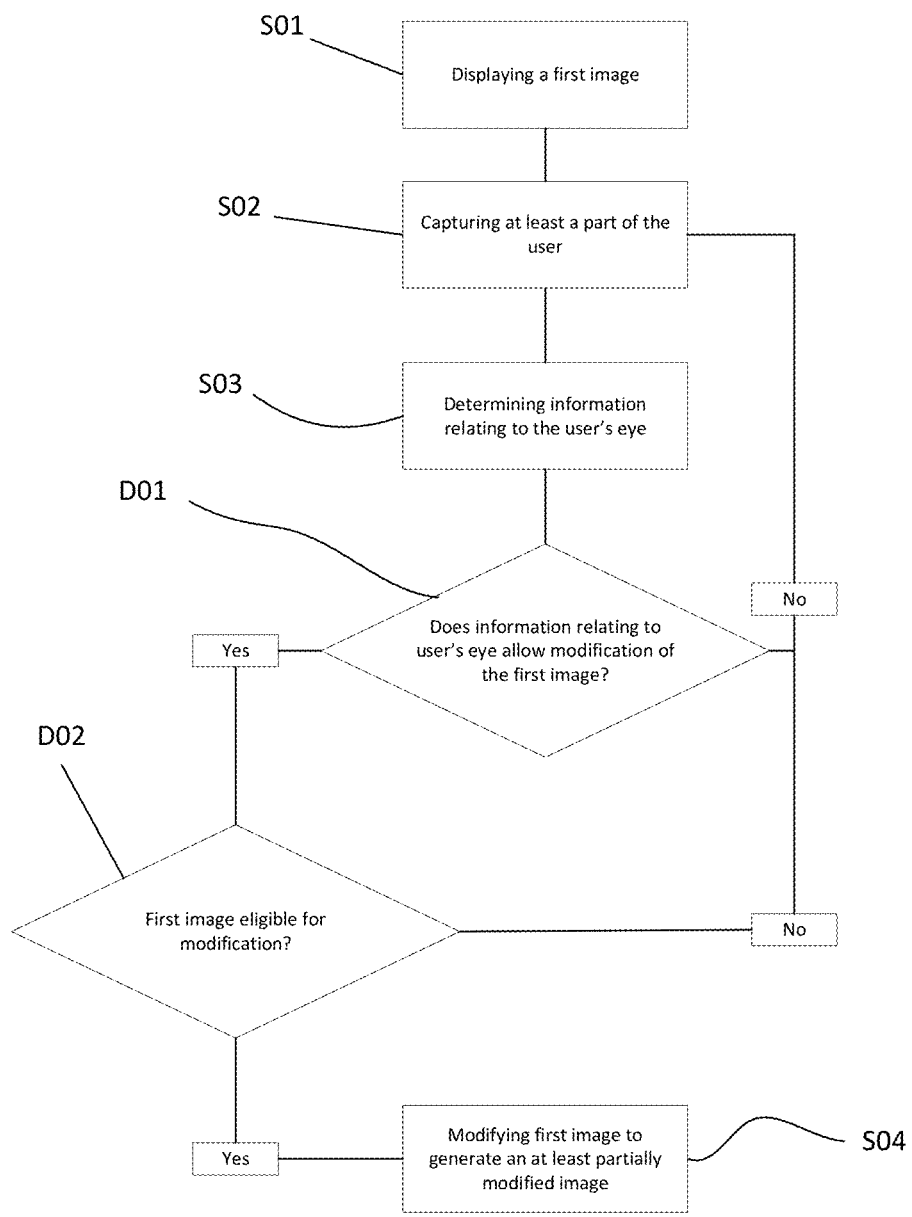
FIG. 6 is a schematic illustration of a method according to embodiments of the invention.
Figure 7:
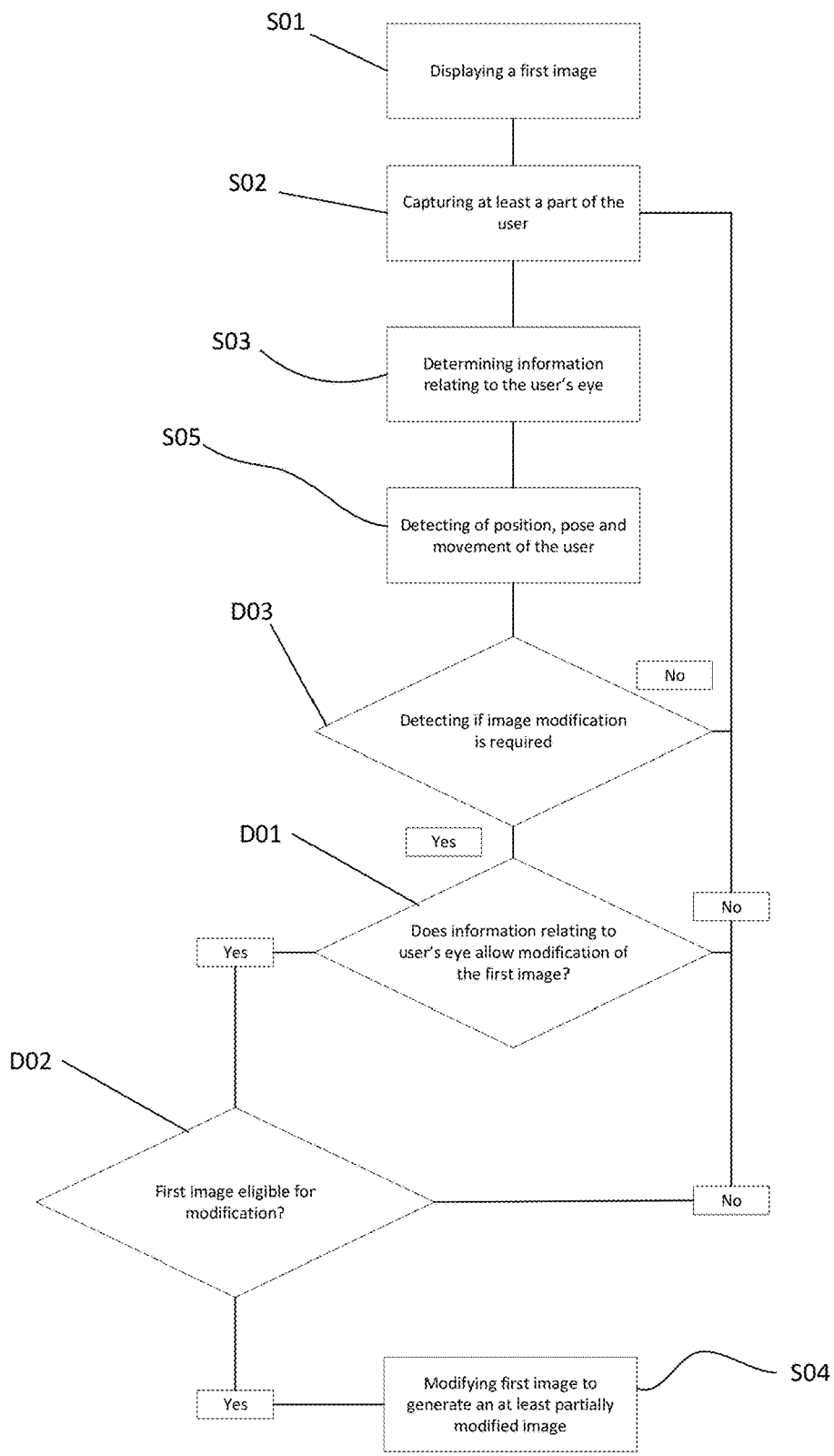
FIG. 7 is another schematic illustration of another method according to embodiments of the invention.

FIG. 6 and FIG. 7 illustrate a method according to one embodiment of the invention. The method of FIG. 6 may comprise the steps of displaying S01 a first image to a user, capturing S02 at least one user image of at least a part of the user, and determining S03 information relating to a user's eye based on the at least one user image.

The method may further comprise the step of modifying S04 the first image to generate at least a partially modified image relative to the first image in real time, without the user noticing, based on the eye or gaze information.

Prior to modifying the first image it may be determined if the eye or gaze information allows D01 for a modification of the first image or not. This may for example be determined by the determination unit 32.

If the above decision D01 is positive it may further be determined, also prior to modifying S04 the first image, if the first image currently displayed in the display 24 is eligible and suitable D02 for being modified to an at least partially modified second image. If the decisions D01 and D02 have a negative outcome a further user image may be captured S02 and information relating to the user's 2 eye may be determined S03. This evaluation may be done taking into account any of the previously described characteristics or criteria relating to the content of the first image. This step may be performed by the scene renderer 30.

FIG. 7 illustrates a similar method as FIG. 6 with the additional step of detecting S05 of a pose, position and/or movement of the user 2. This step may for example be performed by the tracking device 12, which then provides the determination unit 32 with the information so it can take a decision D03 if a modification is required, for example if it is detected that the user is approaching the perimeter or if the user 2 is deviating from a planned movement path. If no modification is required the steps S02, S03 and S05 may be repeated. In case the decision D03 was positive steps or decisions D01 and D02 may then be performed as previously explained referring to FIG. 6. Again the decision steps D01 to D03 are performed prior to the modification S04 of the first image to the at least partially modified second image.

Figure 8:
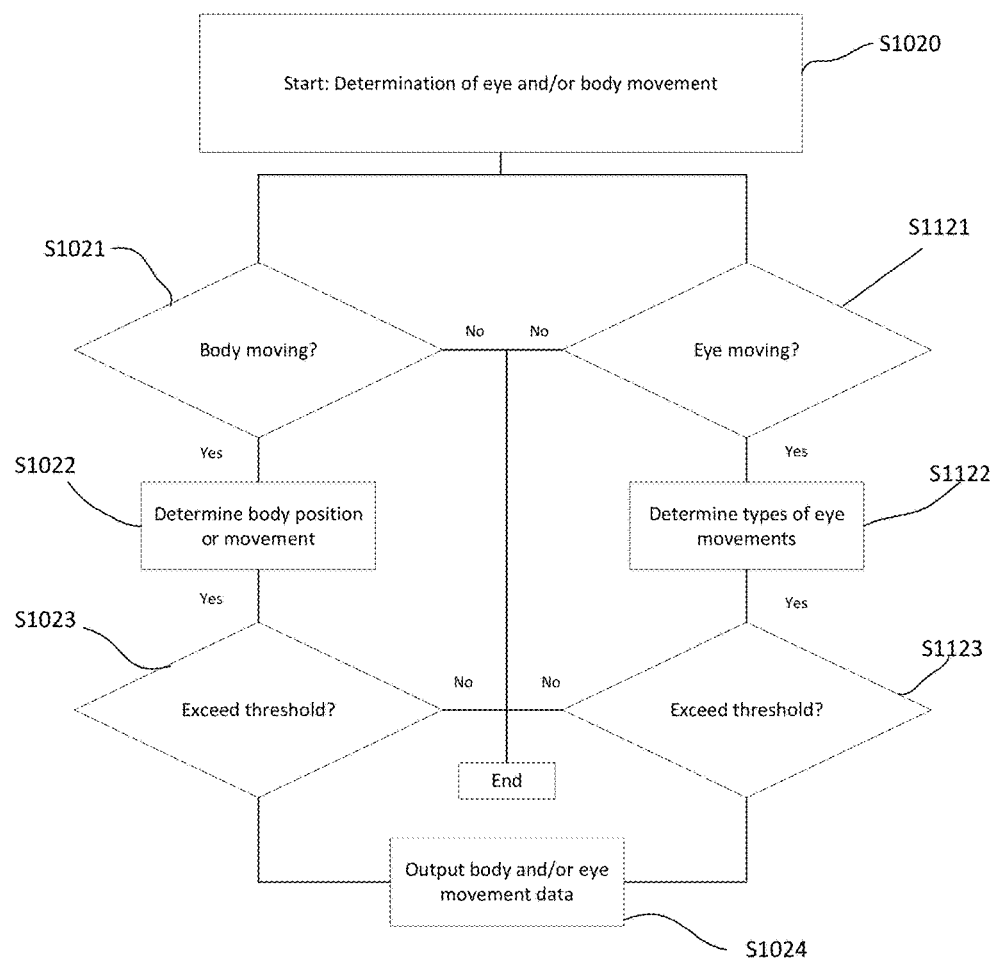
FIG. 8 illustrates another method for determining body and/or eye movement.

FIG. 8 illustrates a method for determining and categorizing eye movement and/or body movement. The method is taking into account the threshold described referring to tables 1 and 2. The method comprises the steps of starting determination of eye and/or body movement S1020. Thereby two paths may be chosen. These two paths may be determining of eye movement and/or body movement. Both paths are done in relation to the user's gaze, thus even if body movement is determined the actual eye or gaze information is what the system will determine. The two paths may be performed simultaneously, for example by the determination unit, the imaging device and some kind of tracking device, as previously describe. The step S1121 determines whether or not the eye is moving, in case the eye is moving the type of eye movement S1122 may be determined and further if this eye movement exceeds the threshold value S1123. If in any of the steps S1121-S1123 the answer is no, the determination is stopped. If the value exceeds the threshold, the eye movement data is provided S1024. The eye movement data can then be used, for example by the scene renderer.

Similarly the steps of determining the eye movement, the body movement may be determined by steps S1021-S1023. First it will be determined if the body is moving S1021, then the position or current movement of the user's body will be determined S1022 and finally it will be checked if the movement or position of the user exceeds the threshold value S1023. If any of the decision steps leads to a no the process will be terminated. If the body movement exceeds the threshold value, the output S1024 of the data comprises then the information relating to the body movement or position of the user.

Figure 9:
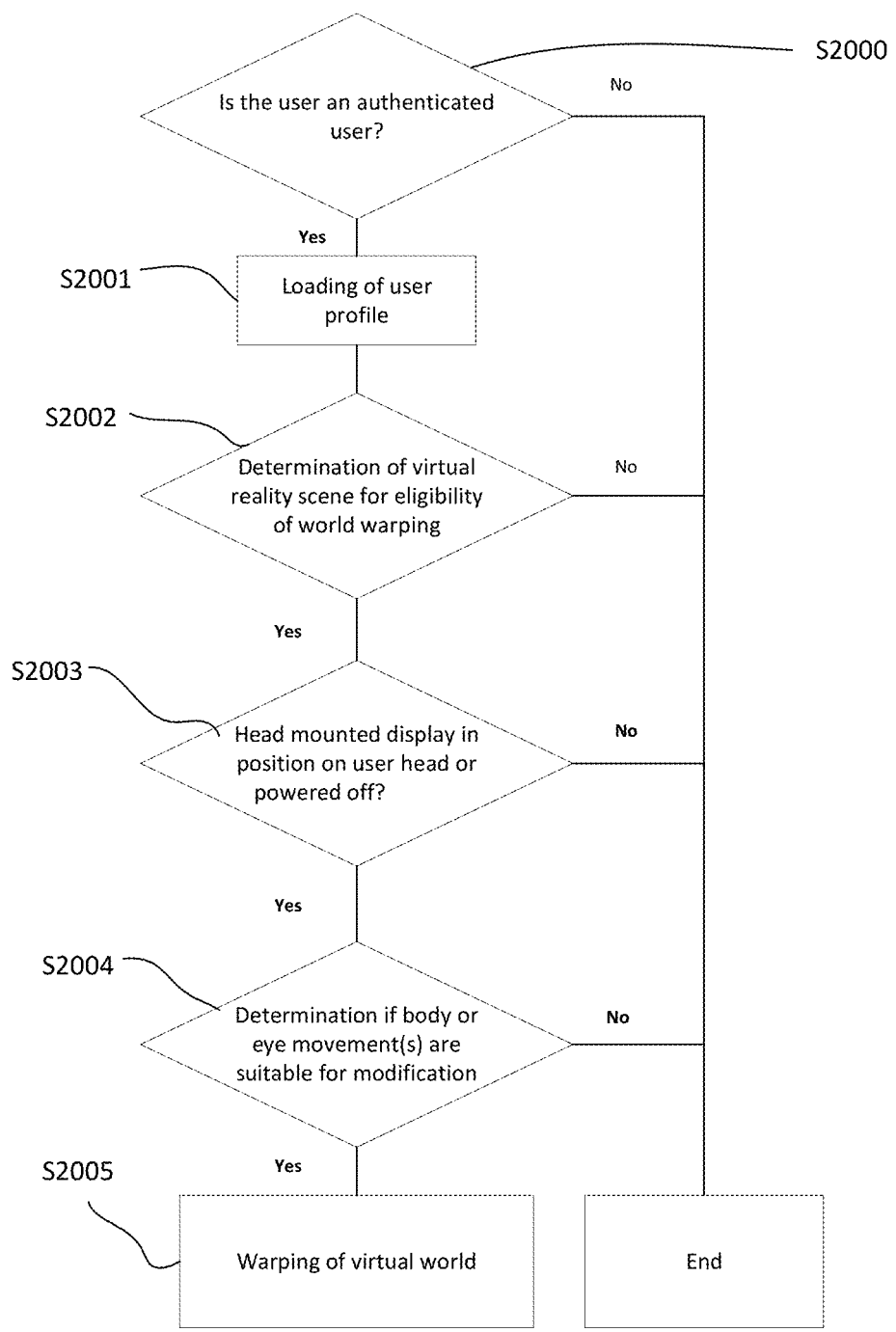
FIG. 9 illustrates another method according to one embodiment of the invention.

FIG. 9 illustrates another method according to one embodiment of the invention. The method comprises the step of identifying and authenticating S2000 the user, if the identification and authentication was successful, the loading S2001 of the user profile in the head mounted display. After loading S2001 of the user profile, it may be determined S2002 whether or not the virtual reality scene or first image currently displayed is eligible for world warping or modification in general. During using of the head mounted display it may actually be determined whether or not the head-mounted display is still in position S2003 or if it was removed by the user in the meantime. Once it is established that the head mounted display is still in place the body or eye movement may be determined S2004, for example as described referring to FIG. 8. Step S2003 may be performed at any time during the method shown in FIG. 9. Thus this step S2003 may even be performed prior to the authentication step S2000. Once it is determined S2004 whether or not the body or eye movement are suitable for modification, the virtual scene may be warped 52005 or modified in another way, for example by changing the avatar's position.

Figure 10:
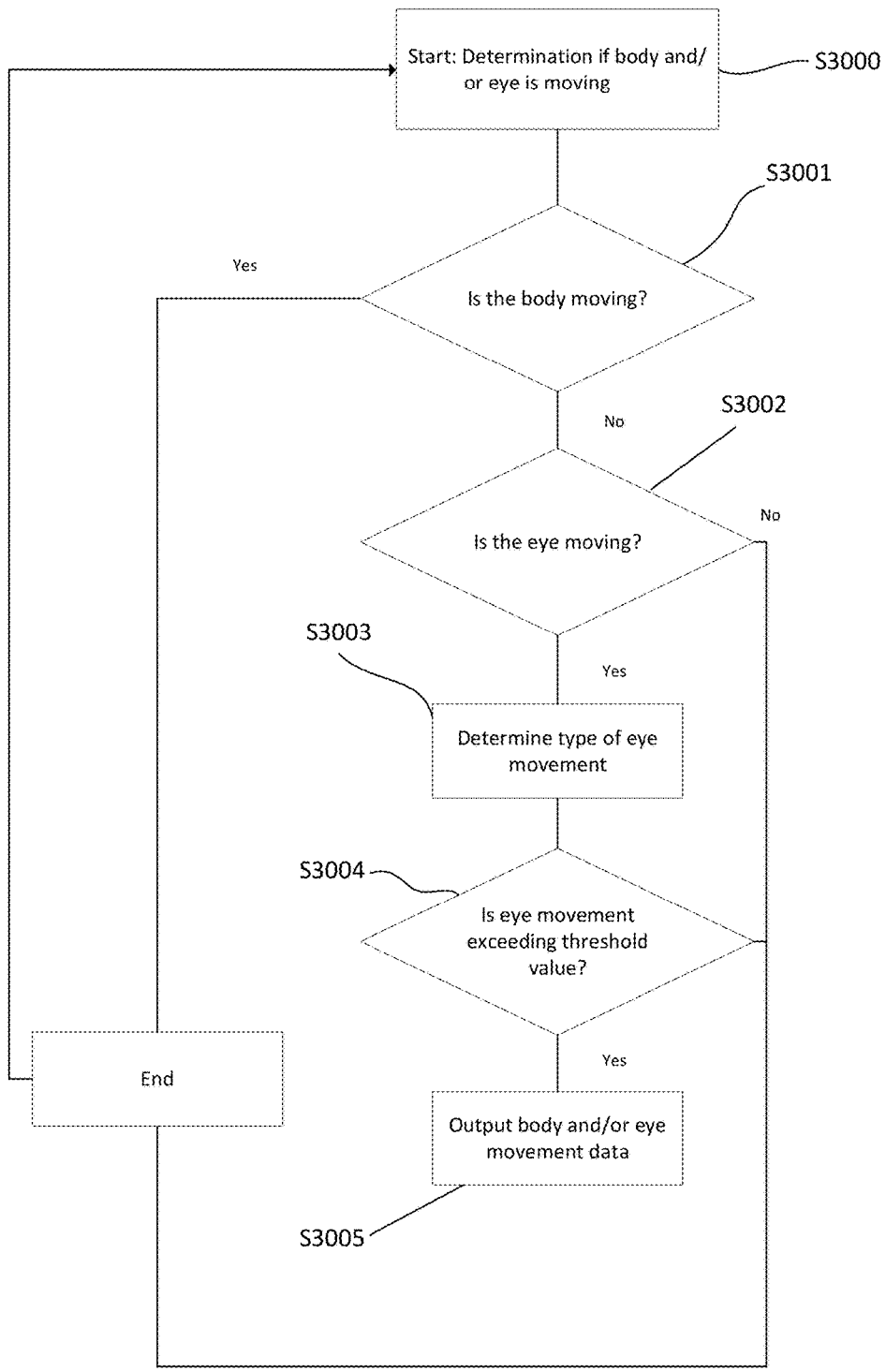
FIG. 10 illustrates a further method according to one embodiment of the invention.

FIG. 10 illustrates a further method according to one embodiment of the invention relating to the eye movement determination. FIG. 10 illustrates a similar method as FIG. 8 but the method is configured to terminate when the body is moving. Thus only eye movements are of interest. Alternatively the method illustrated in FIG. 10 may just ignore body movements in general. The method shown in FIG. 10 illustrates how eye movement may be determined S3002. The system will first initiate and start S3000 a determination process and determine whether or not the body of the user is moving S3001. If the body of the user is not moving S3000 for instance if the user is laying, sitting or standing still, the next step determining S3002 eye movement is performed. If no eye movement is detected the method will stop and start again at step S3000. If eye movement is detected, the type of eye movement, thus blinking, saccade, smooth pursuit, changing of focus, etc. will be determined S3003. Once the eye movement is determined S3003 the method checks S3004 whether or not the eye movement is exceeding a threshold. If the threshold is exceed, information S3005 relating to the eye movement is provided. If the threshold is not exceed the method is ended and started again at step S3000. As indicated previously, in a not shown embodiment the method may completely ignore body movement S3001 and go directly to the determination of eye movement.

Embodiments of the invention have now been described in detail for the purposes of clarity and understanding.

However, it will be appreciated that certain changes and modifications may be practiced within the scope of the appended claims.

What is claimed is:

1. A system comprising:
   a display;
   an imaging device for capturing at least one user image of at least a portion of a user;
   a determination unit configured to determine information relating to at least one eye of the user based at least in part on the at least one user image; and
   a scene renderer configured to generate a first image on the display, wherein the scene renderer is configured to generate an at least partially modified image relative to the first image based at least in part on the information relating to at least one eye of the user, wherein the scene renderer is further configured to determine, based on content of the first image, if the first image is eligible for modification into the at least partially modified image, and
   wherein the scene renderer is further configured to determine if the first image is eligible for modification by determining characteristics of objects in the content of the first image, colors in the content of the first image, and/or audio information currently being played while the first image is displayed, and
   wherein the audio information comprises travelling audio relating to an object, wherein the object is displayed at a first position in the first image and at a second position in the at least partially modified image, and the travelling audio follows the object from the first position to the second position.

2. The system according to claim 1, wherein the information relating to at least one eye of the user corresponds with a period of time in which the user does not actively see at least a portion of the first image.

3. The system according to claim 1, wherein the period of time is an amount of time during which the at least one eye of the user performs a saccade or an eyelid of the at least one eye of the user performs at least a partial blink.

4. The system according to claim 1, wherein the period of time is an amount of time during which a focus of the at least one eye of the user is shifting from a first object shown in the first image to a second object displayed in the at least partially modified image, wherein the first object and the second object are at least partially identical in the first image and the at least partially modified image.

5. The system according to claim 1, wherein the period of time is an amount of time during which the at least one eye of the user is focusing on an edge of the display.

6. The system according to claim 1, wherein the period of time is an amount of time during which the at least one eye of the user is following a moving object in a smooth pursuit on the display, wherein the moving object is shown in the first image and the at least partially modified image.

7. The system according to claim 1, wherein the at least partially modified image comprises a rotated, shifted, zoomed in or out, or distorted image in relation to the first image.

8. The system according to claim 1, wherein the at least partially modified image comprises a rotated image, and wherein the at least partially modified image comprises an image representative of the first image from a rotated viewing point associated with a rotation of a body of the user, and wherein the rotation between the first image and the at least partially modified image is more or less than the rotation of the user's body.

9. The system according to claim 1, wherein the characteristics of objects in the content comprises information regarding a quantity of objects displayed in the first image, the movement of the objects displayed in the first image, a virtual distance between a virtual position of the user and the objects displayed in the first image, and/or relative distance between the objects displayed in the first image.

10. The system according to claim 1, wherein the at least partially modified image comprises as least one of:
    a warped virtual world in relation to a virtual world displayed in the first image; or
    a warped virtual body part of the user in relation to a virtual body part displayed in the first image.

11. The system according to claim 1, wherein the display is a head mounted display.

12. The system according to claim 11, further comprising:
    a tracking device configured to detect a motion, a pose, orientation, and/or a position of the user in a three dimensional space.

13. The system according to claim 12, wherein the tracking device is further configured to:
    detect whether or not the user is approaching a particular perimeter; and
    notify the determination unit if the user is approaching the particular perimeter, wherein upon receiving a notification from the tracking device that the user is approaching the particular perimeter, the determination unit is further configured to, based on the information relating to at least one eye of the user, cause the scene renderer to generate the at least partially modified image in real time during a period of time in which the user does not actively see at least a portion of the first image.

14. The system according to claim 12, wherein the tracking device is further configured to:
    detect if the user is standing, sitting, leaning, walking, running, moving a limb, moving an extremity, moving their torso, and/or moving their head.

15. The system according to claim 12, wherein:
    the at least partially modified image comprises a warped virtual body part of the user in relation to a virtual body part displayed in the first image;
    the warped virtual body part of the user is created based at least in part on a detection of the motion, the pose, and/or the position of the user by the tracking device; and
    the first image comprises the virtual body part of the user.

16. The system according to claim 1, wherein the determination unit is further configured to: identify the user based on the information relating to at least one eye of the user prior to displaying the first image on the display.

17. The system according to claim 1, wherein the information relating to at least one eye of the user comprises information regarding an eye movement of the user.

18. The system according to claim 1, wherein:
    the first image comprises an avatar of the user in a first position; and
    the at least partially modified image comprises the avatar in a second position, wherein the second position is different than the first position.

19. A method for controlling a system in real time, wherein the method comprises:
    displaying a first image to a user;
    capturing at least one user image of at least a portion of the user;

determining information relating to at least one eye of the user based at least in part on the at least one user image; and modifying the first image to generate an at least a partially modified image relative to the first image based at least in part on the information relating to the at least one eye of the user, determining, based on content of the first image, if the first image is eligible for modification into the at least partially modified image, by determining characteristics of objects in the content of the first image, colors in the content of the first image, and/or audio information currently being played while the first image is displayed, and wherein the audio information comprises travelling audio relating to an object, wherein the object is displayed at a first position in the first image and at a second position in the at least partially modified image, and the travelling audio follows the object from the first position to the second position.

20. A non-transitory machine readable medium having instructions stored therein for controlling a system in real time, wherein the instructions are executable by one or more processors to at least:

display a first image to a user;

capture at least one user image of at least a portion of the user;

determine information relating to at least one eye of the user based at least in part on the at least one user image; and modify the first image to generate an at least a partially modified image relative to the first image based at least in part on the information relating to the at least one eye of the user;

determining, based on content of the first image, if the first image is eligible for modification into the at least partially modified image, by determining characteristics of objects in the content of the first image, colors in the content of the first image, and/or audio information currently being played while the first image is displayed, and wherein the audio information comprises travelling audio relating to an object, wherein the object is displayed at a first position in the first image and at a second position in the at least partially modified image, and the travelling audio follows the object from the first position to the second position.

* * * * *